US011118642B2

(12) United States Patent
Barale et al.

(10) Patent No.: US 11,118,642 B2
(45) Date of Patent: Sep. 14, 2021

(54) DISC BRAKE CALIPER AND HUB BRACKET ASSEMBLY

(71) Applicant: FRENI BREMBO S.P.A., Curno (IT)

(72) Inventors: Pietro Barale, Curno (IT); Andrea Milanesi, Curno (IT); Raffaello Cornolti, Curno (IT); Mario Giovanni Tironi, Curno (IT)

(73) Assignee: Freni Brembo S.p.A., Curno Bergamo (IT)

( * ) Notice: Subject to any disclaimer, the term of this patent is extended or adjusted under 35 U.S.C. 154(b) by 45 days.

(21) Appl. No.: 16/489,199

(22) PCT Filed: Feb. 23, 2018

(86) PCT No.: PCT/IB2018/051140
§ 371 (c)(1),
(2) Date: Aug. 27, 2019

(87) PCT Pub. No.: WO2018/154502
PCT Pub. Date: Aug. 30, 2018

(65) Prior Publication Data
US 2019/0390724 A1 Dec. 26, 2019

(30) Foreign Application Priority Data

Feb. 27, 2017 (IT) .......... 102017000021906

(51) Int. Cl.
*F16D 65/095* (2006.01)
*F16D 65/00* (2006.01)
(Continued)

(52) U.S. Cl.
CPC ....... *F16D 65/0056* (2013.01); *F16D 55/228* (2013.01); *F16D 65/0062* (2013.01);
(Continued)

(58) Field of Classification Search
CPC ............ F16D 65/0056; F16D 65/0062; F16D 65/0068; F16D 65/095; F16D 65/847; F16D 55/228
(Continued)

(56) References Cited

U.S. PATENT DOCUMENTS 3,478,844 A    11/1969  Beuchle
5,282,521 A *  2/1994   Leist ..................... F16D 55/227
                                              188/73.39
(Continued)

FOREIGN PATENT DOCUMENTS

EP    1801447 A2   6/2007
WO    98/25804 A1  6/1998
(Continued)

OTHER PUBLICATIONS

European Patent Office, International Search Report, issued in PCT/IB2018/051140, dated May 22, 2018, 4 pages, European Patent Office, Rijswijk, Netherlands.

*Primary Examiner* — Christopher P Schwartz
(74) *Attorney, Agent, or Firm* — Marshall & Melhorn, LLC

(57) ABSTRACT

A brake caliper and hub bracket assembly for a disc brake of a vehicle, comprising at least one caliper and at least one hub bracket, the brake caliper comprising a caliper body comprising a first elongated element, or vehicle side elongated element, suitable for directly or indirectly facing said first braking surface of the brake disc by at least a first brake pad, and a second elongated element, or wheel side elongated element, opposed to the vehicle side elongated element and suitable for directly or indirectly facing said second braking surface of the brake disc by at least a second brake pad. The vehicle side elongated element comprises at least a first thrust means seat suitable for receiving a piston for exerting a thrust action on the at least first brake pad. The wheel side
(Continued)

elongated element comprises at least a second thrust means seat suitable for receiving a piston for exerting a thrust action on the at least second brake pad. The caliper body comprises at least one side caliper bridge suitable for straddling the brake disc, the caliper side bridge connecting the vehicle side elongated element and the wheel side elongated element. The hub bracket comprises a hub bracket body connected to at least one portion of the caliper body, the hub bracket body comprising at least one coupling surface suitable for coupling to at least one bearing for supporting a wheel hub connectable to the brake disc and to a wheel of the vehicle.

13 Claims, 16 Drawing Sheets

(51) Int. Cl.
*F16D 55/228* (2006.01)
*F16D 55/00* (2006.01)
*F16D 121/04* (2012.01)
*F16D 125/58* (2012.01)

(52) U.S. Cl.
CPC .. *F16D 65/0068* (2013.01); *F16D 2055/0008* (2013.01); *F16D 2055/0012* (2013.01); *F16D 2055/0016* (2013.01); *F16D 2121/04* (2013.01); *F16D 2125/582* (2013.01)

(58) Field of Classification Search
USPC ................................ 188/73.31, 73.39, 73.46
See application file for complete search history.

(56) References Cited

U.S. PATENT DOCUMENTS

| | | | |
|---|---|---|---|
| 6,131,932 | A | 10/2000 | Bunker |
| 6,223,863 | B1 | 5/2001 | Bunker |
| 6,247,560 | B1 | 6/2001 | Bunker |
| 6,640,937 | B2 | 11/2003 | Bunker |
| 6,962,243 | B2 | 11/2005 | Seeley et al. |
| 7,673,723 | B2 | 3/2010 | Paul et al. |
| 8,905,200 | B2 | 12/2014 | Gutelius |
| 9,371,874 | B2 | 6/2016 | Previtali et al. |
| 9,458,901 | B2 | 10/2016 | Gutelius |
| 2002/0104719 | A1* | 8/2002 | Nakayama .......... F16D 65/0006 188/73.46 |
| 2010/0078269 | A1 | 4/2010 | Tokunaga et al. |
| 2015/0096849 | A1* | 4/2015 | Plantan ............... F16D 65/0056 188/73.46 |
| 2020/0232529 | A1* | 7/2020 | Cervantes ............ F16D 65/095 |
| 2020/0292020 | A1* | 9/2020 | Arienti ..................... B60T 5/00 |

FOREIGN PATENT DOCUMENTS

| | | |
|---|---|---|
| WO | 00/66908 A1 | 11/2000 |
| WO | 2012/059894 A2 | 5/2012 |

\* cited by examiner

DISC BRAKE CALIPER AND HUB BRACKET ASSEMBLY

FIELD OF THE INVENTION

The present invention relates to a disc brake caliper and hub bracket assembly, or brake caliper support, and also to a disc brake comprising said assembly.

BACKGROUND ART

The brake caliper in a disc brake is generally arranged straddling the outer peripheral margin of a brake disc, suitable for rotating about a rotation axis defining an axial direction (X-X); there is also defined a radial direction (R-R) which is substantially orthogonal to said axial direction (X-X), and a tangential (C-C) or circumferential direction (C-C), both orthogonal to said axial direction (X-X) and to said radial direction (R-R).

The brake caliper usually comprises a body having two elongated elements which are arranged so as to directly or indirectly face each other by means of the interposition of brake pads, at opposite braking surfaces of the brake disc, in which caliper bridges connect the two elongated elements to each other by straddling the brake disc. Brake pads are provided arranged between each elongated element of the caliper and the braking surface of the brake disc. The caliper comprises various components mounted on the body, such as pistons, seals, bleeding devices and brake fluid supply conduits. Generally, at least one of said elongated elements of the caliper body has cylinders suitable for housing hydraulic pistons capable of exerting a thrust action on the pads by abutting them against the braking surfaces of the disc to exert a braking action on the vehicle.

Typically, the caliper body is made of metal such as for example, aluminum, or aluminum alloy, for example aluminum and lithium, or of steel, and may be obtained by melting, but also by mechanical processing by removing swarf, and also by forging. The caliper body may be made in single piece so as to reduce the number of parts to be assembled and particularly when obtained by melting, to make the whole caliper body with one casting operation alone. Alternatively, the caliper body may also be made in two half-calipers which are associated with each other by means of fastening means, for example threaded fastening means, along a plane which typically coincides with the median plane of the disc on which the caliper is arranged straddling.

In floating caliper bodies associated with fixed discs, a sliding portion of the caliper body has a cylinder, or cylinders, suitable for housing hydraulic pistons capable of exerting a thrust action on the friction pad facing it, thus abutting it against the braking surface of the disc, while it slides on the bracket, or fixed portion of the caliper, and acts on the second friction pad abutting it against the brake disc to exert the braking action on the vehicle.

In fixed caliper bodies associated with fixed discs, there is a cylinder, or cylinders, suitable for housing hydraulic pistons capable of exerting a thrust action on the friction pad facing it on both the opposite sides of the caliper body.

Brake calipers usually are restrained to a support structure which remains stationary with respect to the vehicle wheel, such as for example an axle-journal of a suspension of a vehicle or a hub of a vehicle wheel. In a typical arrangement, one of the two elongated elements of the fixed caliper body has coupling portions of the caliper body to the support structure, for example by providing slots or eyelets, for example arranged axially, or through holes, for example arranged radially, suitable for receiving screws or stud bolts for fastening the caliper which, with the ends thereof, are housed in threaded holes provided on the support of the caliper. For example, document US-2-0104719 shows a solution of brake caliper restrained to the support structure or hub bracket by means of axial screws.

The pressure applied by the driver of the vehicle to the brake pedal exerts, through a brake pump, a pressure of the brake fluid which, through a conduct, is applied to the brake fluid in the hydraulic circuit arranged in the caliper body up to reaching the cylinders where the pressure is exerted on the surface of the bottom of the pistons, thus forcing them to tighten against the pads, which in turn abut against the braking surfaces of the disc. The pressure action of the brake fluid also is exerted on the bottom wall of the cylinder, thus causing a reaction in the caliper body which deforms it away from the surfaces of the disc and, due to the restraint between the caliper and the support thereof arranged only on the side of the caliper of the hub side elongated element, a cut and torsion deformation which brings the elongated element which is not restrained to the support, or wheel side elongated element, to move with respect to the hub side elongated element, thus flexing the caliper bridges which connect these elongated elements to one another.

The caliper body also is deformed according to the torque exerted by the action of the pistons which abut the pads against the braking surfaces of the disc applied in directions which form torque arms with respect to the fastening points of the caliper body to the support thereof. These torques deform the caliper body also in tangential and radial direction with respect to the disc, in addition to axial direction. This deformation of the caliper body results in an increase of the piston stroke and therefore an increase of the stroke of the brake pedal.

The need is therefore felt for the caliper body to have a sufficient structural rigidity so as to ensure that this deformation of the caliper body caused by the braking action is kept within tolerable values, which in addition to avoiding damage to the braking system, do not create the sensation for the driver of a yielding braking system, thus causing an extra-stroke of the braking system lever or pedal, creating a sensation of a "spongy" system.

This need pushes to have highly rigid structures for the caliper bodies, and therefore to increase the volume and weight thereof, in applications where this may be possible.

However, caliper bodies of increased volume and structural rigidity result in difficult assembly of the brake disc to the caliper and also of the brake pads to the caliper body. Additionally, recently brake discs tend to be of increasing diameter, thereby decreasing the space within the rim of the vehicle wheel intended to receive the caliper, thus making it highly desirable to make calipers with the radial volume as contained as possible.

On the other hand, being restrained to the suspension of the vehicle and arranged straddling the disc, the caliper body is one of the non-hung masses which weight is to be reduced as much as possible, or kept constant, albeit while increasing performance, also braking performance, of the vehicle. Obviously, these considerations become extreme when the vehicle is of the racing type and the user wants to have a braking system which is extremely ready for his/her commands and simultaneously very lightweight so as not to penalize the performance of the racing vehicle.

At the same time, the caliper body and also the support structure or hub bracket should possibly provide wide openings to allow the ventilation of the disc brake and a rapid evacuation of the heat generated by the friction between the brake pads and the braking surfaces of the brake disc during the braking.

Solutions are known of caliper bodies studied specifically to increase the features of structural rigidity, such as for example shown in U.S. Pat. No. 3,478,844, in which the vehicle side half-caliper is made in single piece with the support structure or hub bracket. For example, document WO-2012-059894, to the same Applicant, shows a brake caliper restrained to the support structure or hub bracket in which an arm of the support structure is arranged straddling the brake disc to be restrained to the wheel side elongated element of the caliper body.

Moreover, as shown for example in documents U.S. Pat. Nos. 6,131,932, 6,247,560, WO-98-25804, WO-00-66908 and US-2004-065515, solutions are known of floating or sliding caliper, in which the fixed or axially non-sliding part of the caliper is made in single piece with the hub bracket. For example, document US-2015-0144439 shows a floating caliper which is hinged by means of a joint to the hub bracket, to facilitate the mounting and disassembly of the brake pads.

These known solutions however do not allow obtaining assemblies of caliper and the support thereof which maximize the structural rigidity of the caliper body while keeping the weights unaltered and simultaneously being capable of containing the volumes as much as possible so as to facilitate the mounting of the caliper body also within the rim and wheel on which brake discs having large diameter are mounted, and also so as to allow an adequate evacuation of the heat generated during the braking action, and without however making the mounting and disassembly operations of the brake pads to/from the caliper body, laborious.

The need is therefore strongly felt to devise a solution for the drawbacks mentioned with reference to the prior art.

The need is felt to make a disc brake caliper assembly and support thereof or hub bracket which has improved structural features, the weight of the caliper body being equal, or equal structural features with a more contained weight with respect to the solutions of the prior art.

The need is felt to make a disc brake caliper assembly and support thereof or hub bracket which has improved structural features, the weight of the caliper body being equal, or equal structural features with a more contained weight with respect to the solutions of the prior art, and at the same time which allows satisfactory performance in terms of heat evacuation.

Solution

It is an object of the present invention to obviate the drawbacks of the prior art and to provide a solution to the needs mentioned hereto with reference to the prior art.

This and other objects are achieved by an assembly according to claim 1, and also by a disc brake according to claim 8, and also by a method according to claim 9.

Certain advantageous embodiments are the subject of the dependent claims.

DRAWINGS

Further features and advantages of the assembly, disc brake and method will become apparent from the description provided below of preferred embodiments thereof, given by way of non-limiting examples, with reference to the accompanying drawings, in which.

Figure 1:
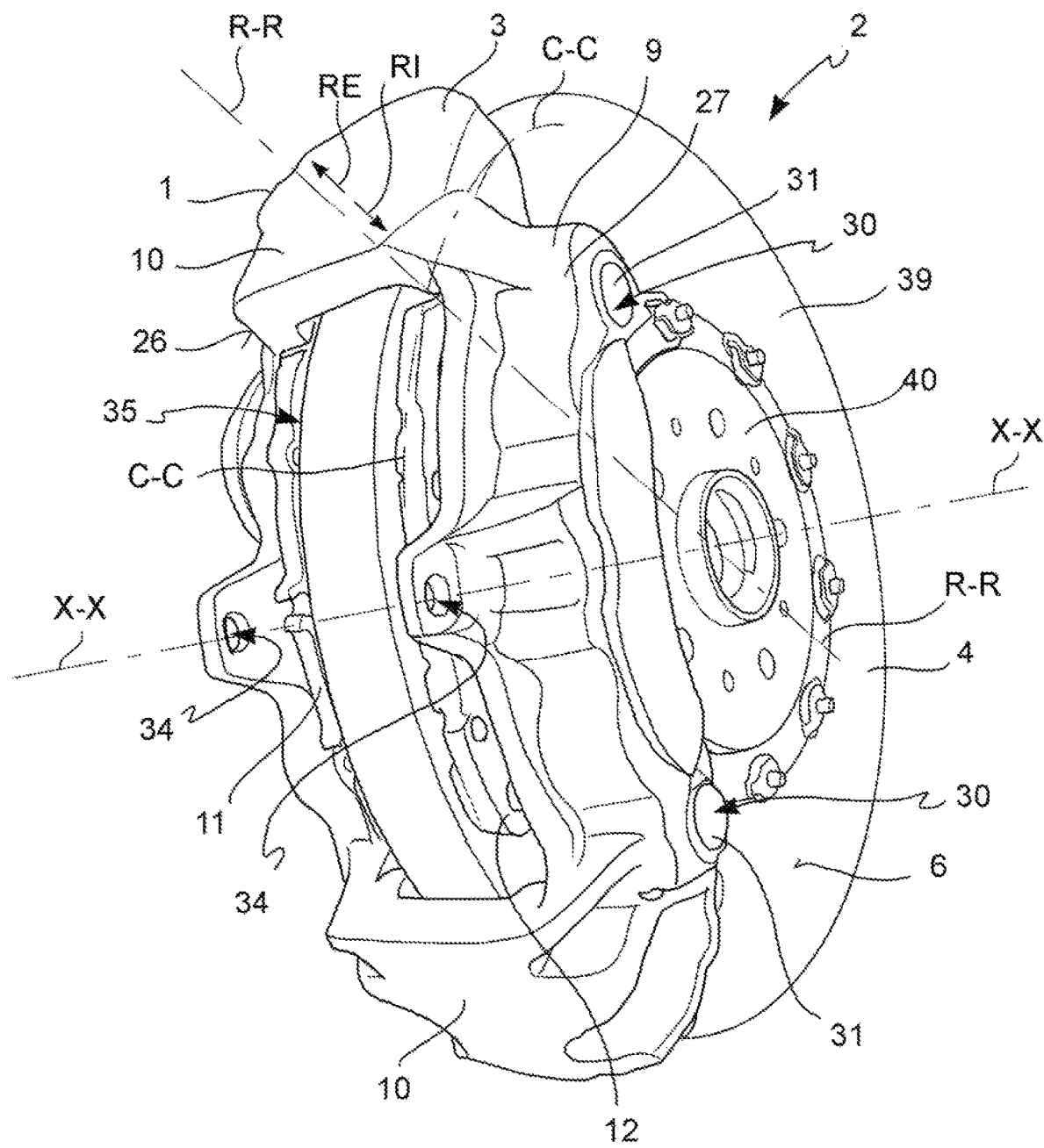
FIG. 1 is a radially outer axonometric view of a disc brake comprising a brake caliper and hub bracket assembly according to one embodiment.
Figure 2:
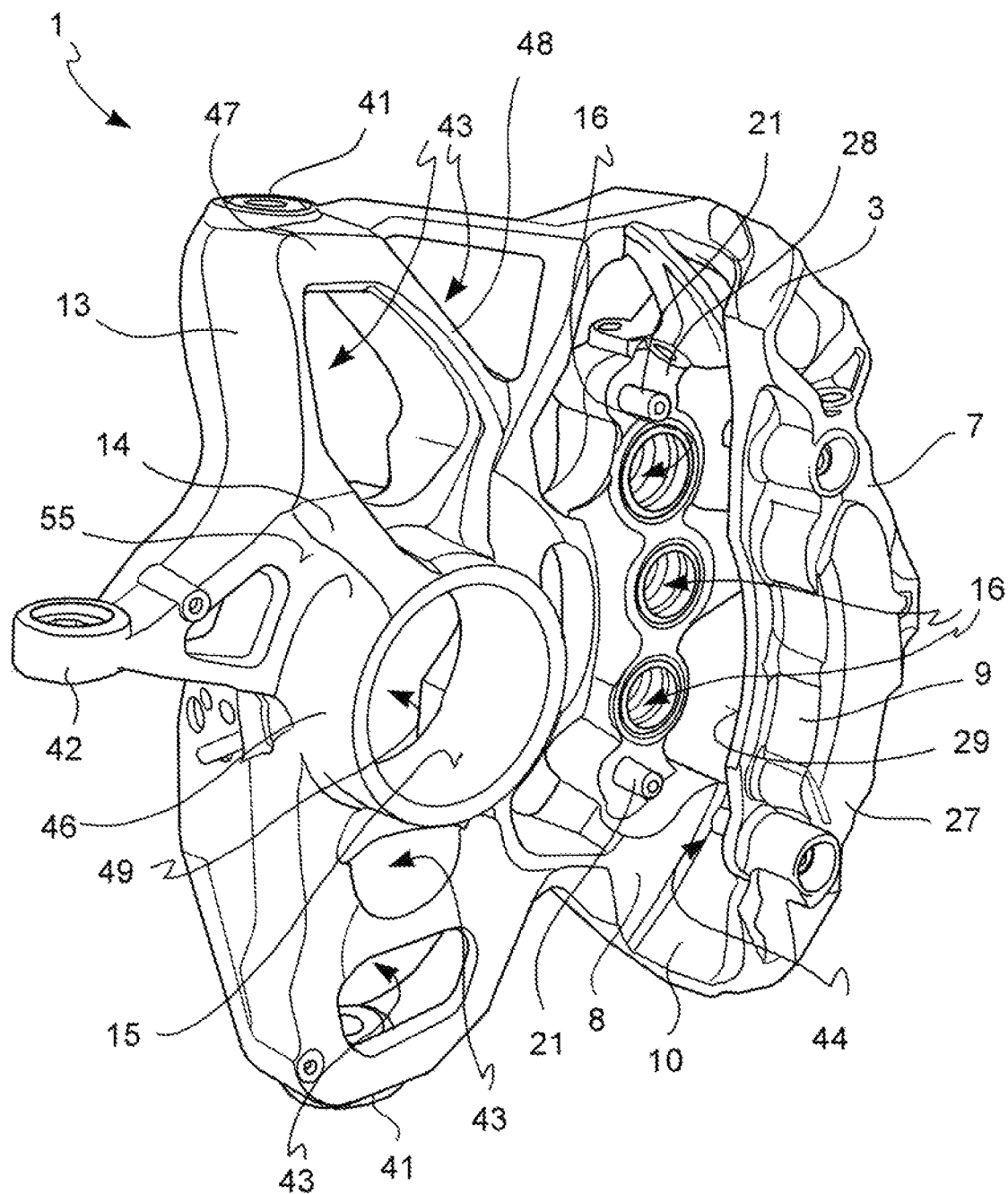
FIG. 2 is an axonometric view of a brake caliper and hub bracket assembly according to one embodiment.
Figure 3:
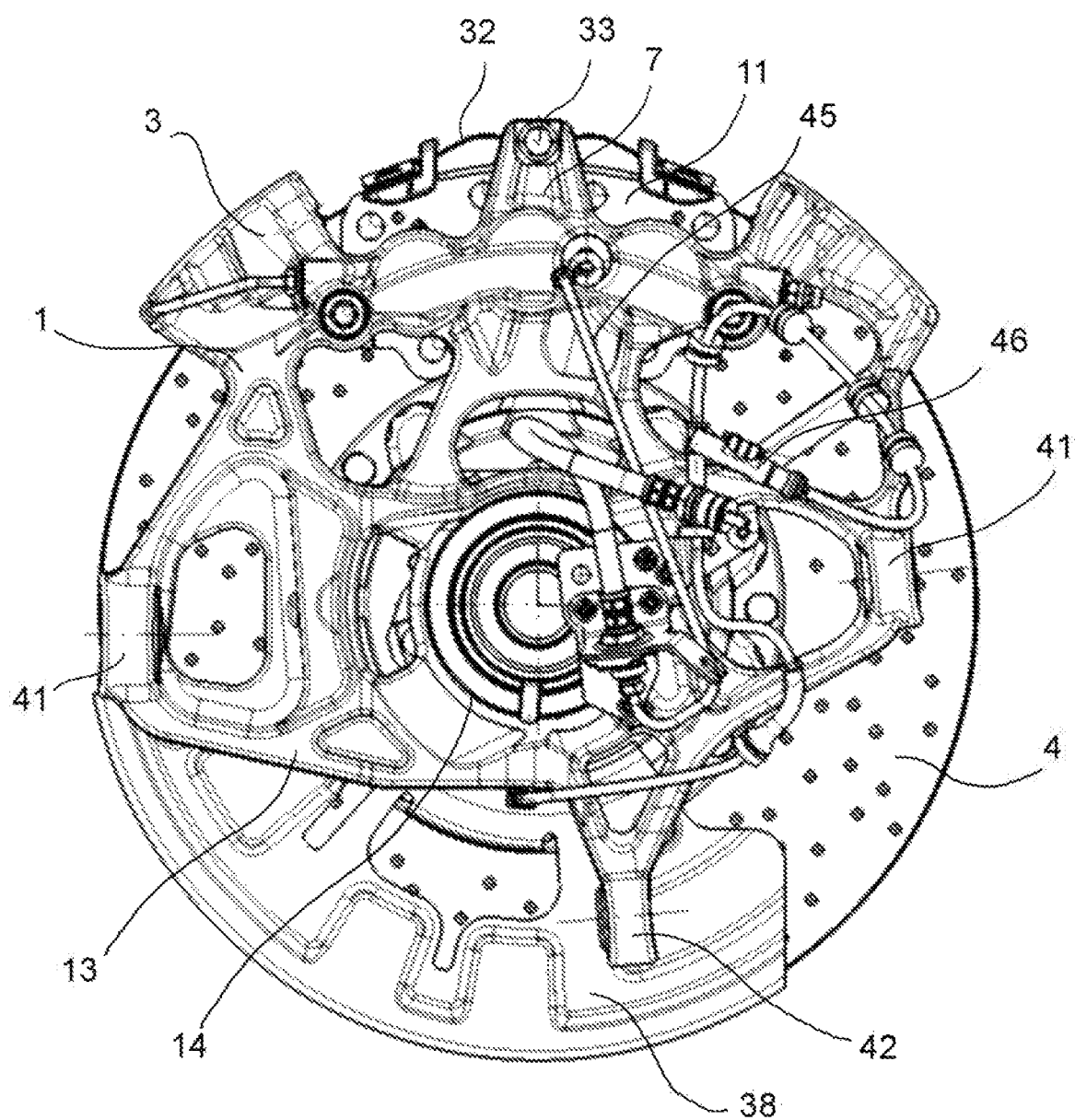
FIG. 3 is an elevational vertical view of a brake caliper and hub bracket assembly associated with a brake disc, according to one embodiment.
Figure 4:
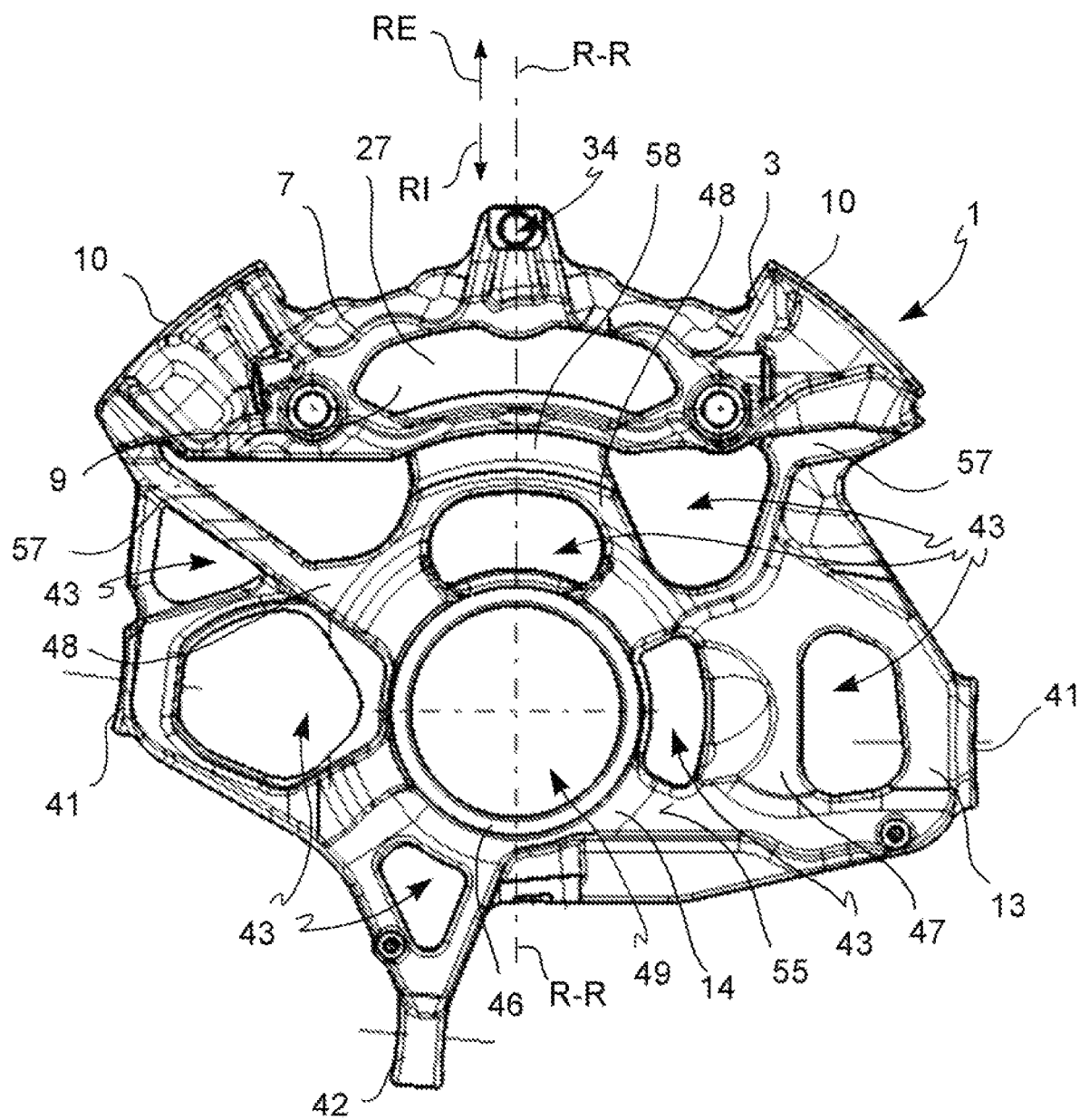
FIG. 4 is an elevational vertical view of a brake caliper and hub bracket assembly according to one embodiment.
Figure 5:
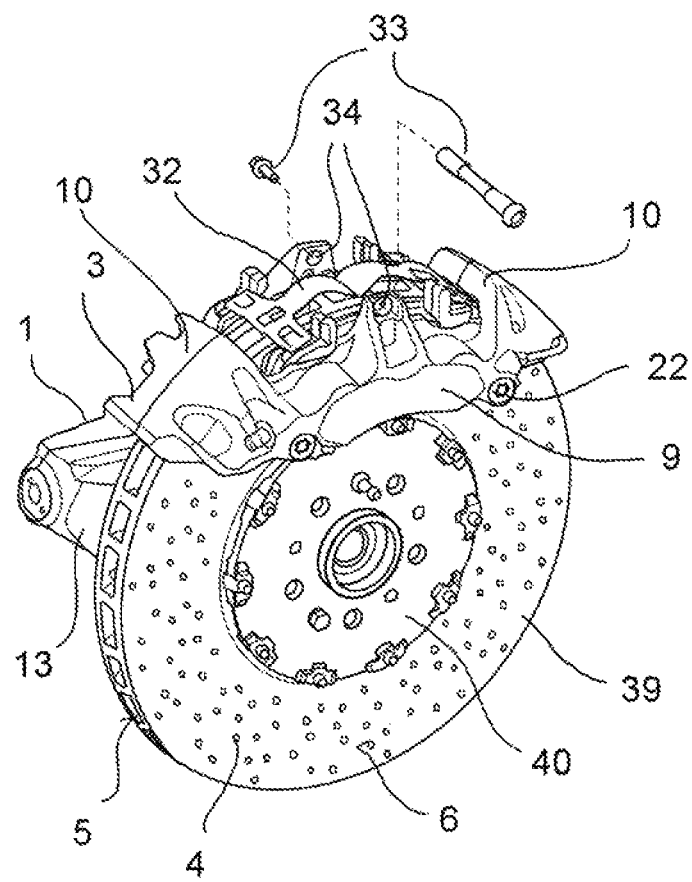
Figure 6:
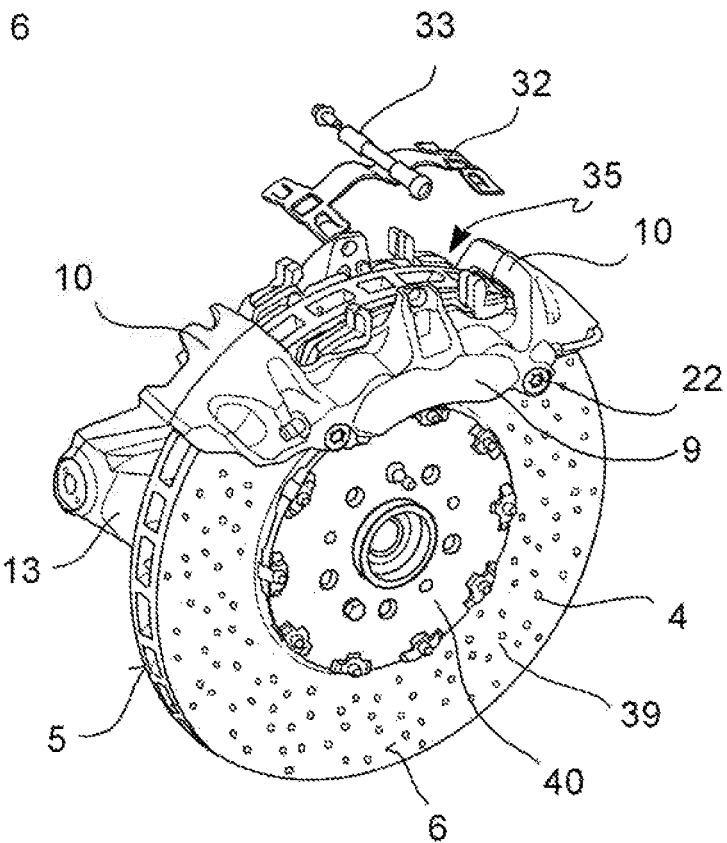
Figure 7:
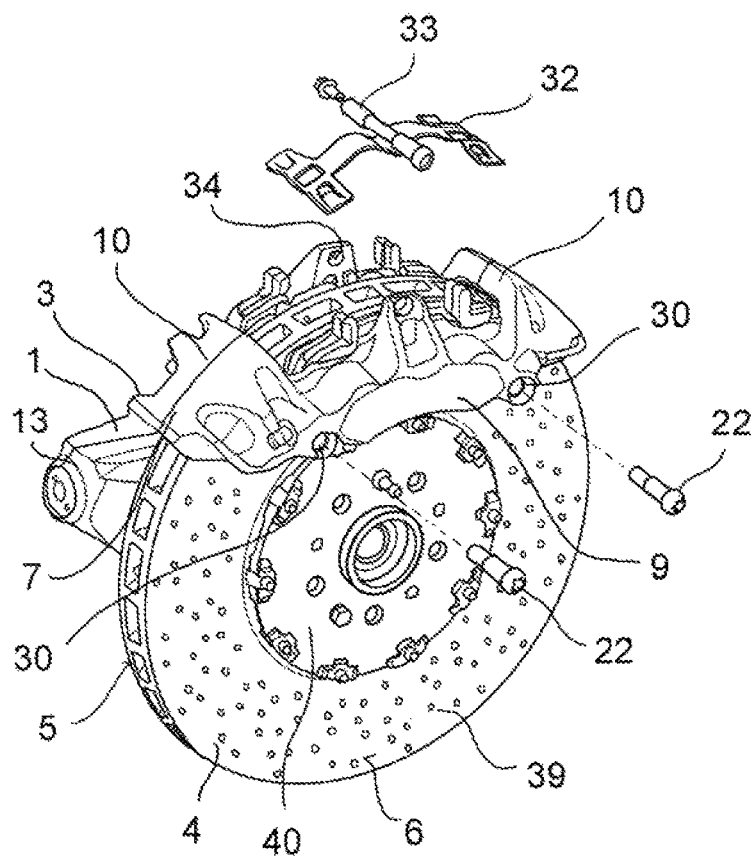
Figure 8:
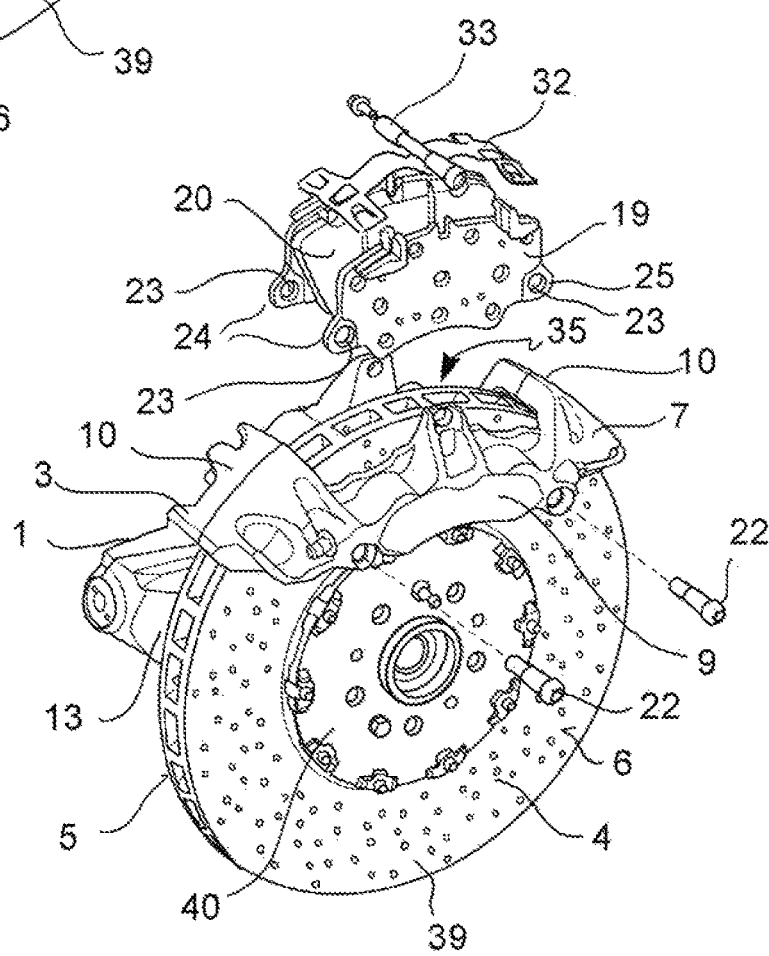
Figure 9:
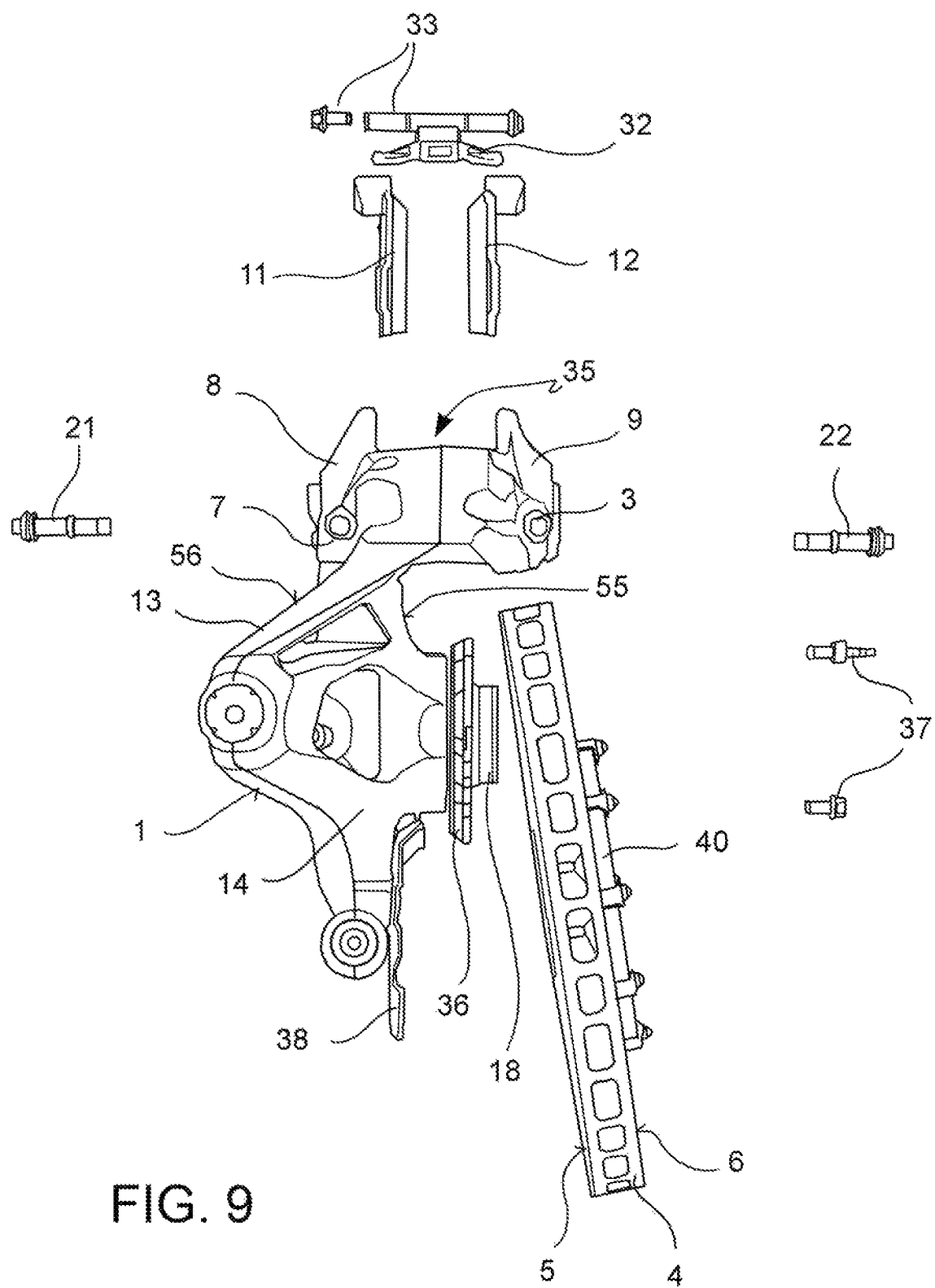
Figure 10:
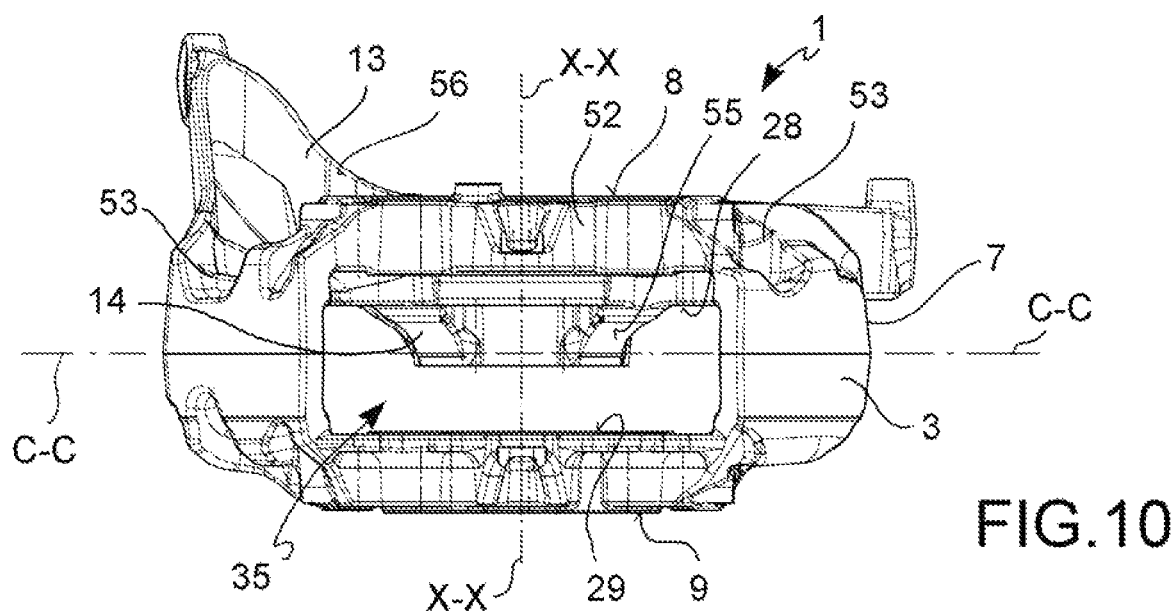
Figure 11:
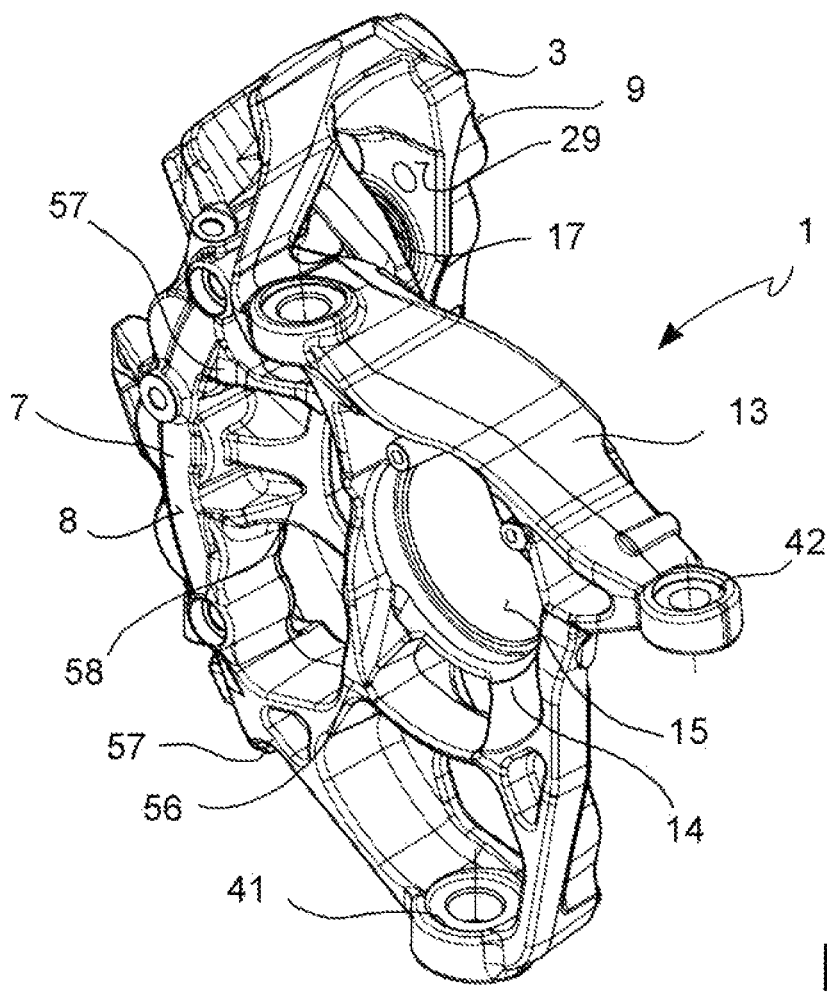
Figure 12:
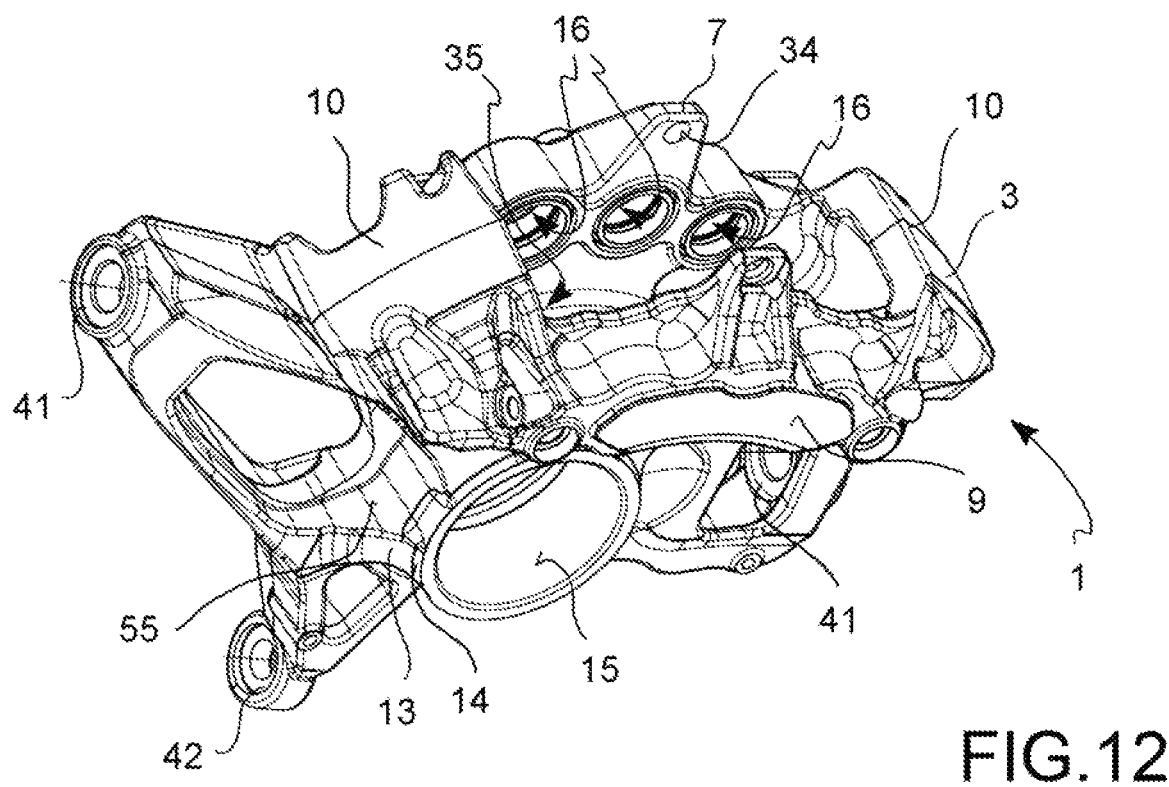
Figure 13:
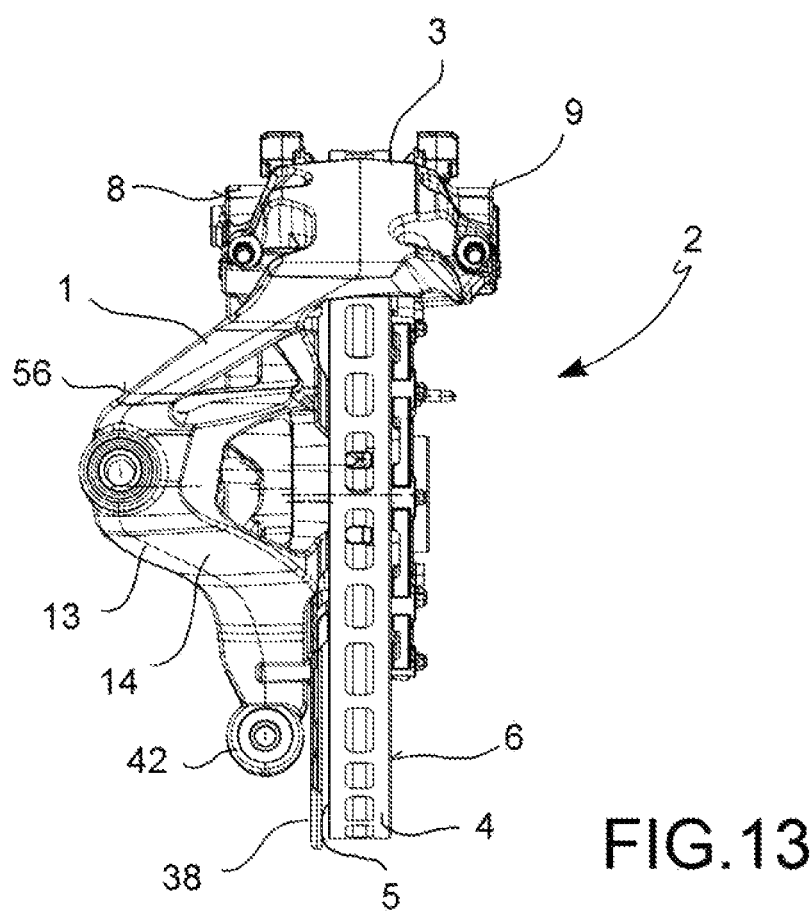
Figure 14:
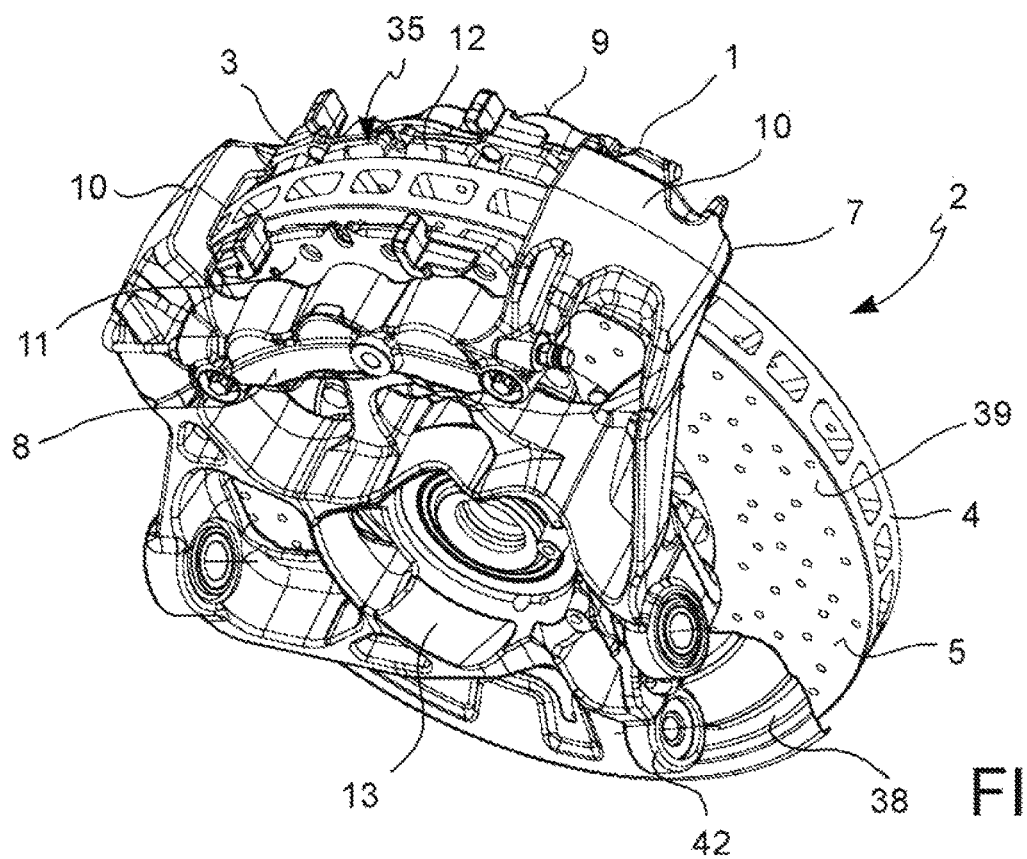
Figure 15:
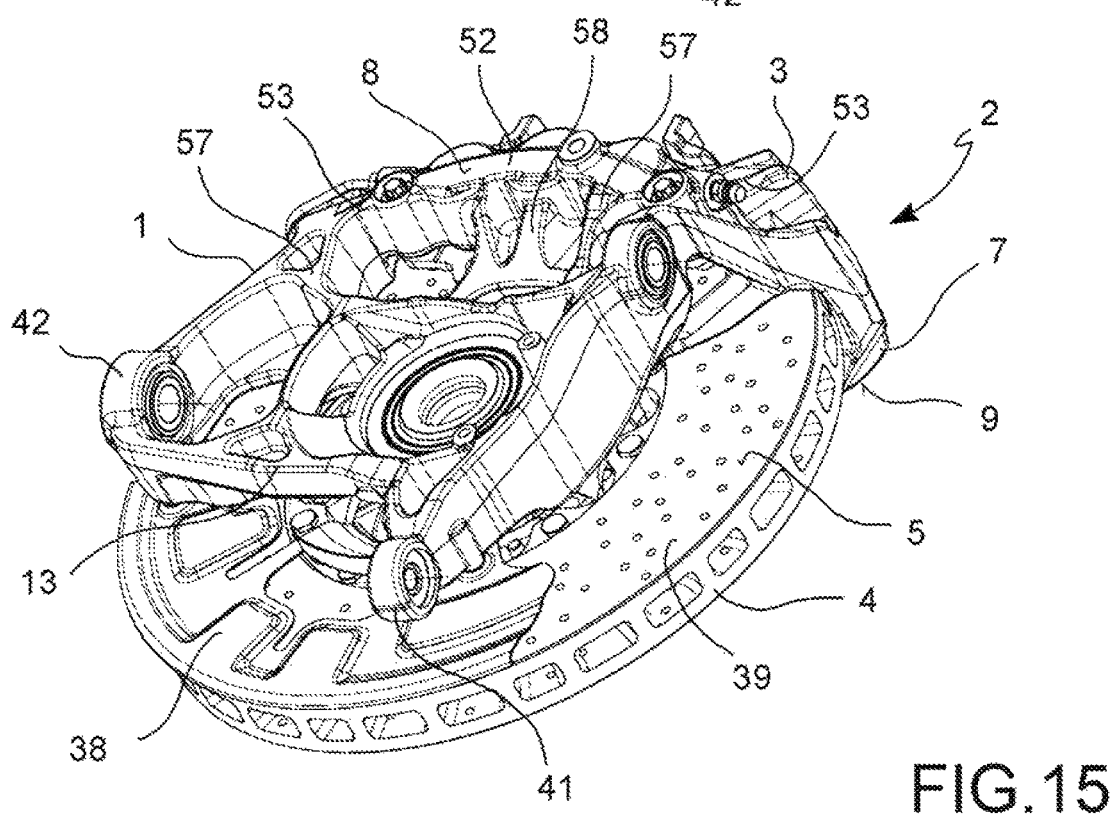
Figure 16:
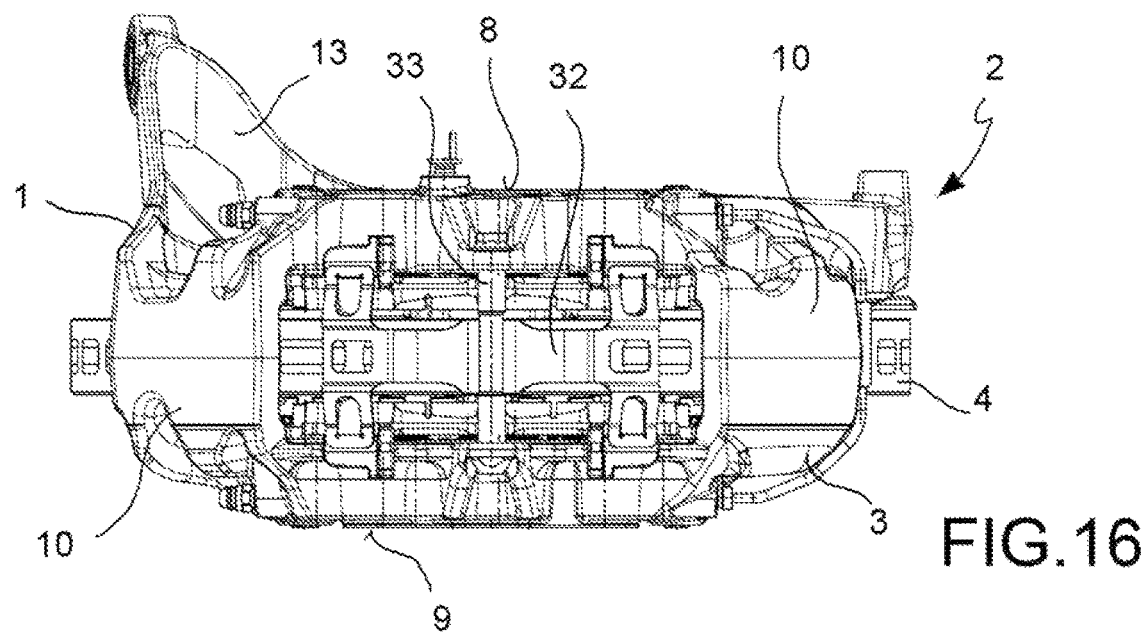
Figure 17:
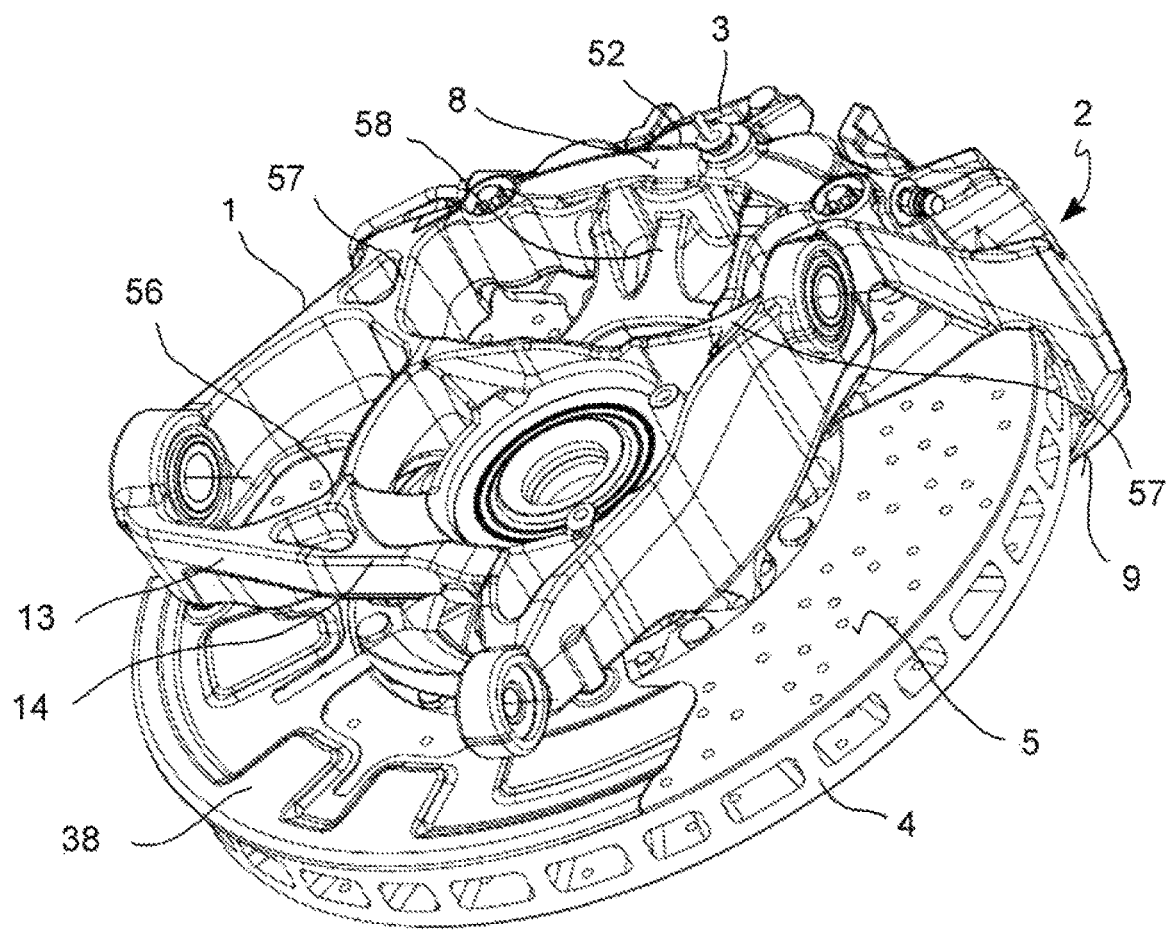
Figure 18:
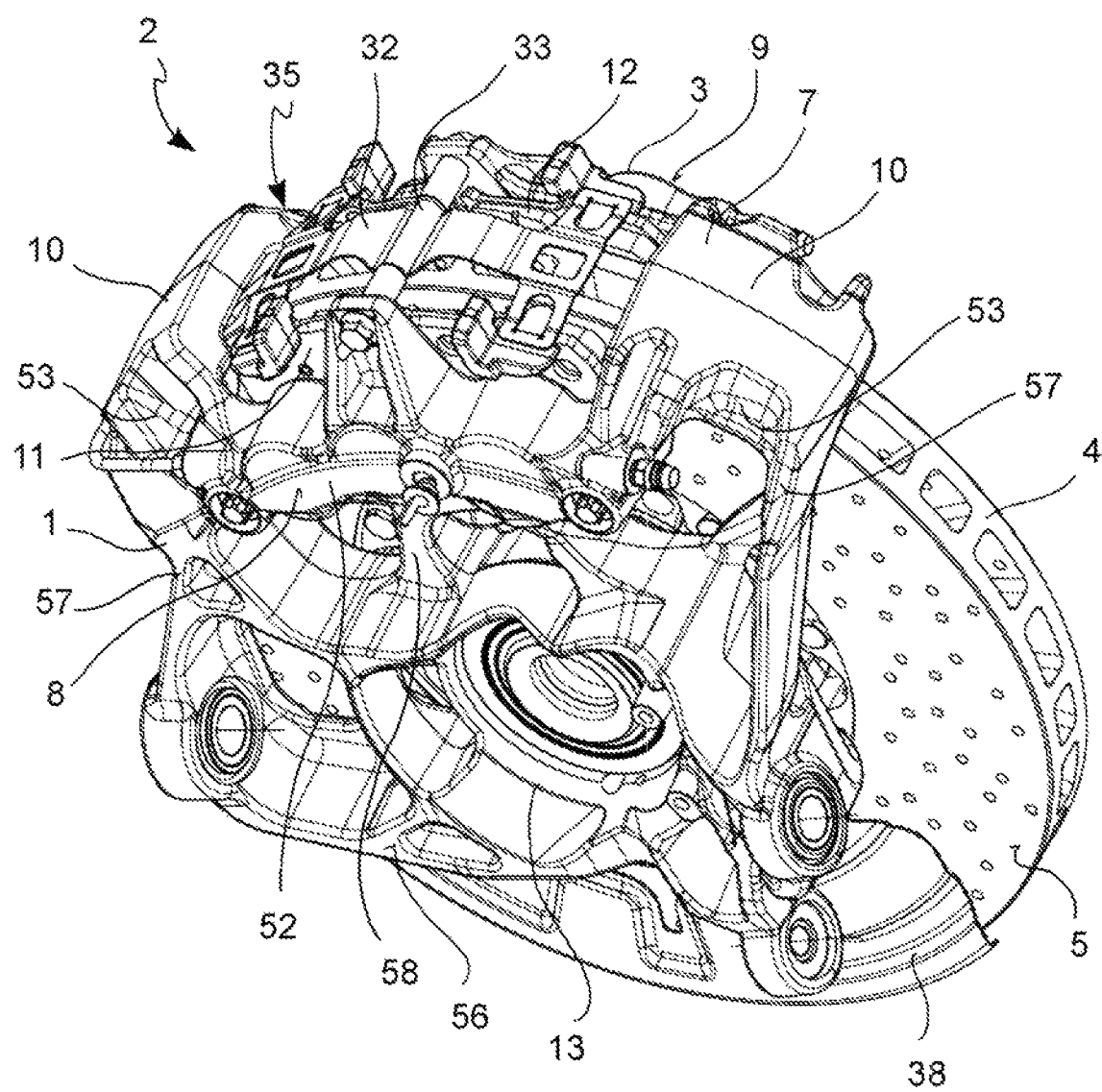
Figure 19:
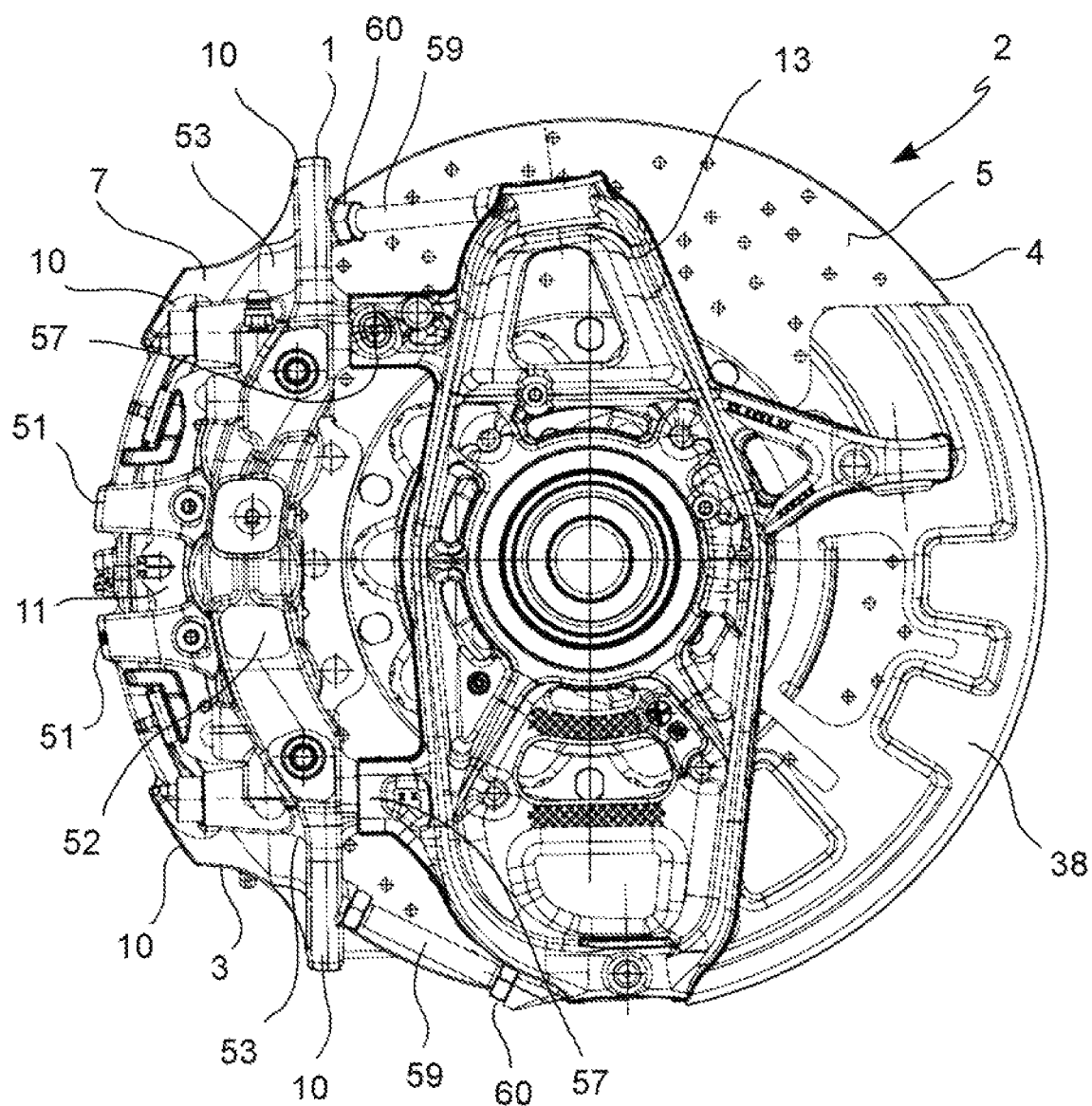
Figure 20:
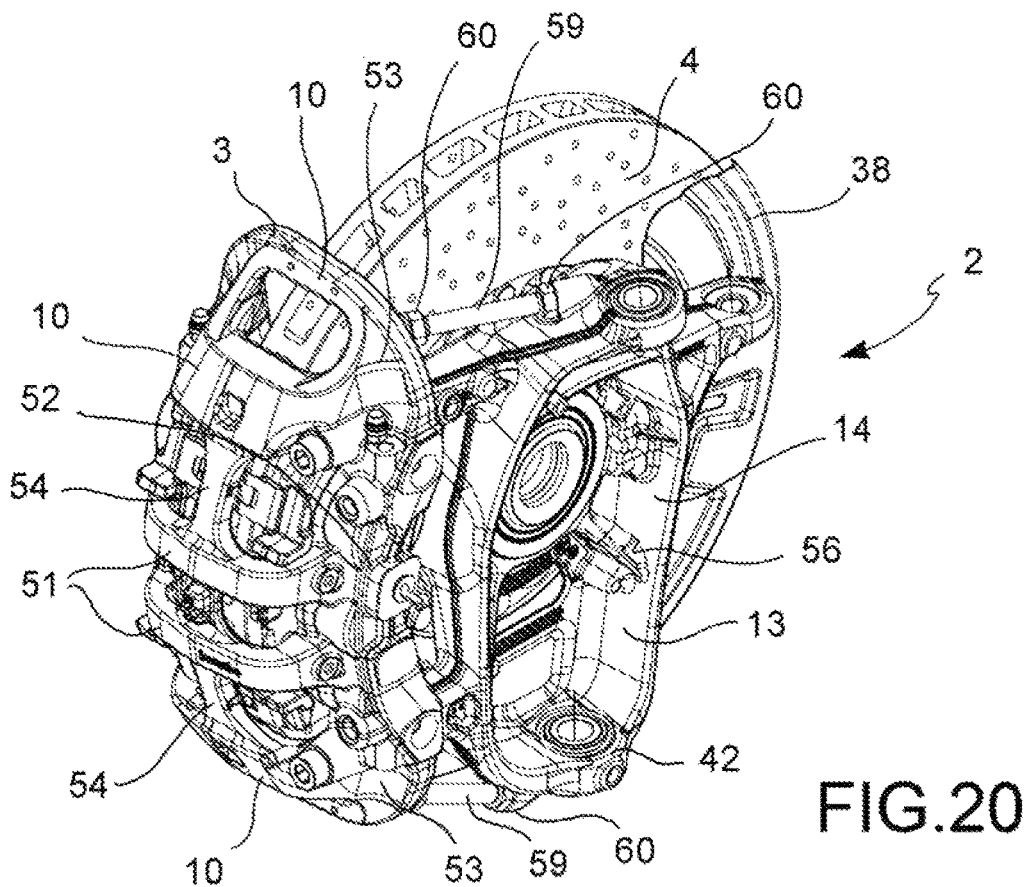
Figure 21:
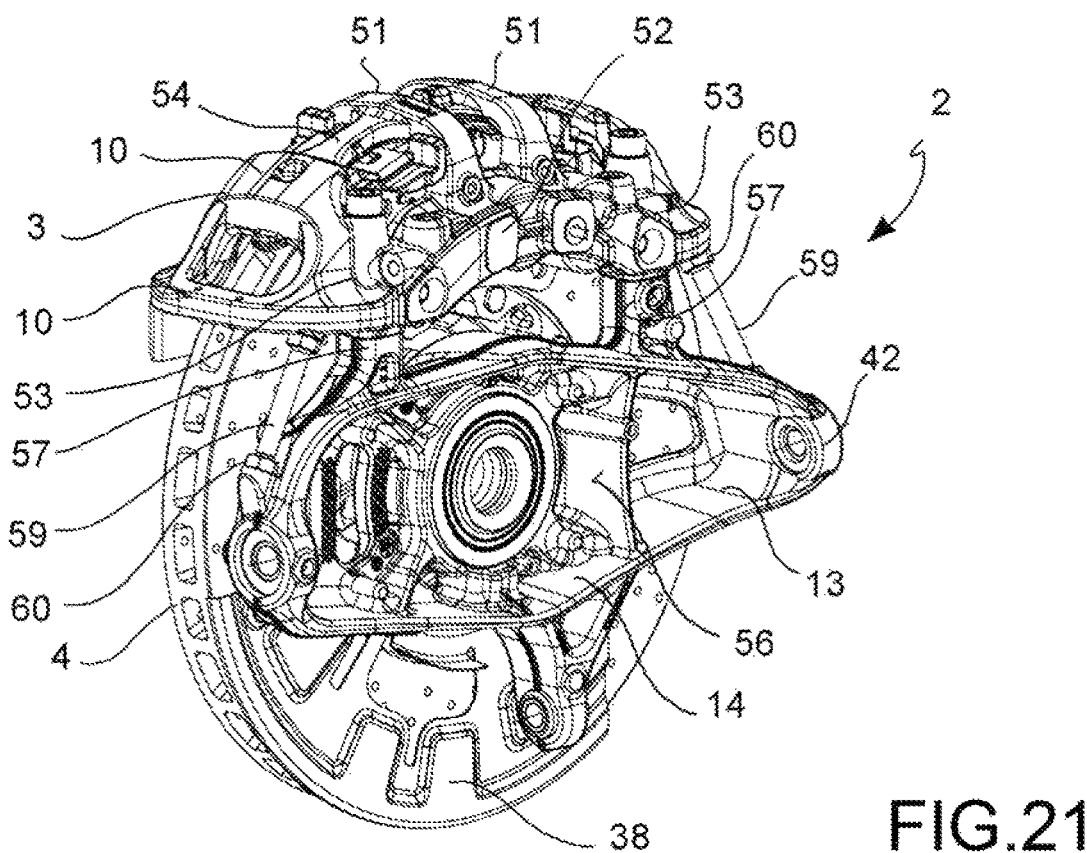
Figure 22:
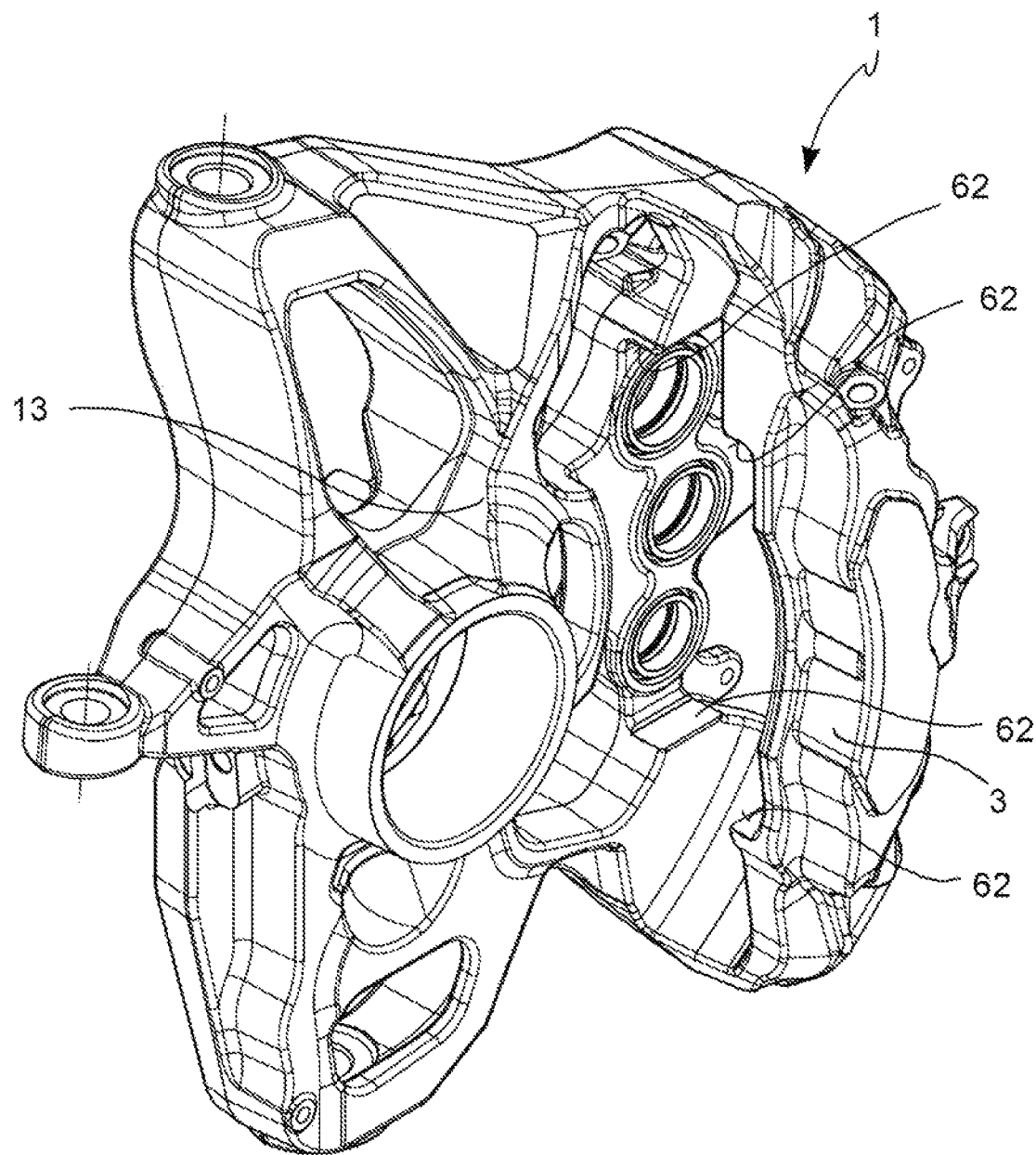
Figure 23:
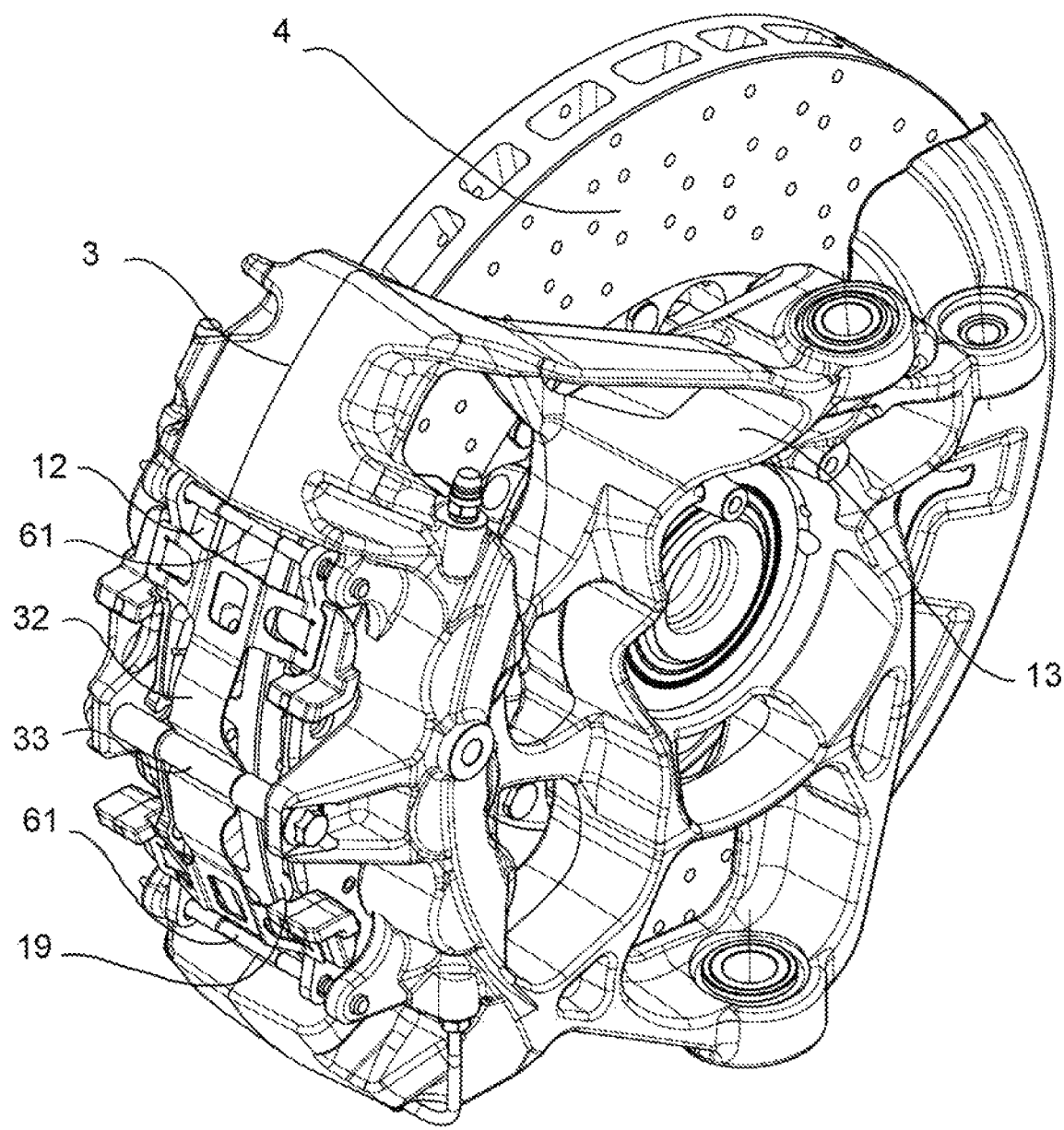

figures from 5 to 8 are axonometric views and with separate parts, showing a disc brake comprising a brake caliper and hub bracket assembly according to one embodiment, and also certain possible steps of an assembly method of a disc brake;

FIG. 9 is an elevational vertical view and with separate parts, showing a disc brake comprising a brake caliper and hub bracket assembly according to one embodiment;

FIG. 10 is a radially outer plan view of the brake caliper and hub bracket assembly shown in FIG. 4;

FIG. 11 is a radially inner axonometric view of the brake caliper and hub bracket assembly shown in FIG. 4;

FIG. 12 is a radially outer axonometric view of the brake caliper and hub bracket assembly shown in FIG. 4;

FIG. 13 is an elevational vertical view of a disc brake comprising a brake caliper and hub bracket assembly according to one embodiment;

FIG. 14 is a radially outer axonometric view of the disc brake comprising a brake caliper and hub bracket assembly shown in FIG. 13;

FIGS. 14 and 15 are axonometric views of the disc brake comprising a brake caliper and hub bracket assembly shown in FIG. 13;

FIG. 16 is a radially outer plan view of a disc brake comprising a brake caliper and hub bracket assembly according to one embodiment;

FIGS. 17 and 18 are axonometric views of the disc brake comprising a brake caliper and hub bracket assembly shown in FIG. 16;

FIG. 19 is an elevational vertical view of a disc brake comprising a brake caliper and hub bracket assembly according to one embodiment;

FIGS. 20 and 21 are axonometric views of the disc brake comprising a brake caliper and hub bracket assembly shown in FIG. 19;

FIG. 22 is an axonometric view of a brake caliper and hub bracket assembly according to a further embodiment in which the caliper body has flat pad resting surfaces suitable for receiving, in abutment, pads hanging from the caliper body by means of pins;

FIG. 23 is an axonometric view of a disc brake comprising a brake caliper and hub bracket assembly shown in FIG. 22.

DESCRIPTION OF SOME PREFERRED EMBODIMENTS

According to a general embodiment, a brake caliper and hub bracket assembly 1 for a disc brake 2 of a vehicle comprises at least one brake caliper 3 suitable for straddling a brake disc 4 of a disc brake 2, and a hub bracket 13 suitable for providing a support for said brake caliper 3.

Said brake disc 4 has a first braking surface 5 and a second braking surface 6, opposite to said first braking surface 5. According to one embodiment, said brake disc 4 comprises a braking band 39 comprising said first braking surface 5 and said second braking surface 6, and a disc bell 40.

Said disc brake 2 defines an axial direction X-X coinciding with or parallel to the rotation axis of the brake disc 4, a radial direction R-R orthogonal to the axial direction X-X and defining an outer radial direction RE, when facing away from the rotation axis of the brake disc 4, and an opposite inner radial direction RI, and a circumferential C-C or tangential direction C-C, both orthogonal to the axial direction X-X and to the radial direction R-R. The axial X-X, radial R-R and circumferential C-C directions are defined also on the brake caliper and hub bracket assembly 1, when considered alone.

Said brake caliper 3 comprises a caliper body 7.

Said caliper body 7 comprises a first elongated element 8, or vehicle side elongated element 8, suitable for directly or indirectly facing said first braking surface 5 of the brake disc 4 by means of at least a first brake pad 11, and a second elongated element 9, or wheel side elongated element 9 opposed to said vehicle side elongated element 8 and suitable for directly or indirectly facing said second braking surface 6 of the brake disc 4 by means of at least a second brake pad 12.

According to one embodiment, said vehicle side elongated element 8 comprises an inner caliper side of vehicle side elongated element 28 suitable for facing the first braking surface 5 of the brake disc 4, and said wheel side elongated element 9 comprises an inner caliper side of wheel side elongated element 29 suitable for facing the second braking surface 6 of the brake disc 4.

According to one embodiment, said vehicle side elongated element 8 comprises an outer caliper side of vehicle side elongated element 26, opposite to said inner caliper side of vehicle side elongated element 28, and said wheel side elongated element 9 comprises an outer caliper side of wheel side elongated element 27, opposite to said inner caliper side of wheel side elongated element 29.

According to one embodiment, an inner caliper volume 44 is defined in said caliper body 7, between said inner caliper side of vehicle side elongated element 28 and said outer caliper side of wheel side elongated element 29. The term "inner caliper volume" does not mean a volume completely surrounded by portions of the caliper body 7, rather it means a volume at least partly delimited by said inner caliper side of vehicle side elongated element 28 and said outer caliper side of wheel side elongated element 29, and suitable for receiving the brake pads 11, 12 and a portion of the brake disc 4. Said inner caliper volume 44 is suitable for receiving at least two opposed brake pads 11, 12 and at least one portion of the braking band 39 of the brake disc 4.

According to one embodiment, said vehicle side elongated element 8 of the caliper body 7 comprises a central portion of vehicle side elongated element 52 and two side portions of vehicle side elongated element 53, which are circumferentially opposite to said central portion of vehicle side elongated element 52. Preferably, said central portion of vehicle side elongated element 52 comprises said at least a first thrust means seat 16 and even more preferably, said central portion of vehicle side elongated element 52 comprises a plurality of first thrust means seats 16. Preferably, said two end portions of vehicle side elongated element 53 avoid comprising said at least a first thrust means seat 16. According to one embodiment, said two end portions of vehicle side elongated element 53 are located on opposite sides in circumferential direction C-C relative to the portion of said vehicle side elongated element 8 which delimits said at least a first thrust seat 16.

Said vehicle side elongated element 8 of the caliper body 7 comprises at least a first thrust means seat 16 suitable for receiving a piston for exerting a thrust action on said at least a first brake pad 11. Said wheel side elongated element 9 of the caliper body 7 comprises at least a second thrust means seat 17 suitable for receiving a piston for exerting a thrust action on said at least a second brake pad 12. According to one embodiment, said brake caliper 3 comprises at least one piston accommodated in said at least a first thrust means seat 16 and at least one piston accommodated in said second thrust means seat 17. Thereby, said brake caliper 3 comprises opposed thrust means, for example cylinder-piston assemblies suitable for exerting a thrust action on opposed brake pads 11, 12.

Preferably, said brake caliper 3 is a fixed caliper which can be associated with a fixed brake disc. Alternatively, said brake caliper 3 is a fixed caliper which can be associated with a floating or axially sliding brake disc.

According to one embodiment, said caliper body 7 comprises at least one caliper bridge 10, 51 suitable for straddling the brake disc 4; said caliper bridge 10, 51 connects said vehicle side elongated element 8 and said wheel side elongated element 9. Preferably, said at least one caliper bridge 10, 51, said vehicle side elongated element 8 and said wheel side elongated element 9 are made in single piece.

According to one embodiment, said caliper body 7 comprises at least one side caliper bridge 10 suitable for straddling the brake disc 4. Preferably, said at least one side caliper bridge 10 connects one of said two side portions of vehicle side elongated element 53 with said wheel side elongated element 9.

According to one embodiment, said caliper body 7 comprises at least two side caliper bridges 10. Preferably, said at least two side caliper bridges 10 are spaced apart from one another in circumferential direction C-C by a predetermined circumferential distance, in which said predetermined circumferential distance is greater than or equal to the extension in circumferential direction C-C of the at least one brake pad 11, 12. According to one embodiment, said at least two side caliper bridges 10 are located at opposite circumferential ends of the caliper body 7. According to one embodiment, said at least two side caliper bridges 10 are located circumferentially opposite relative to the brake pads 11, 12.

According to one embodiment, said caliper body 7 further comprises at least one central caliper bridge 51 suitable for straddling the brake disc 4. Preferably, said at least one central caliper bridge 51 connects said central portion of vehicle side elongated element 52 with said wheel side elongated element 9.

According to one embodiment, said caliper body 7 comprises at least one circumferential bridge 54 which connects two adjacent caliper bridges 10, 51 to each other. Preferably, said at least one circumferential bridge 54 avoids being directly connected to the vehicle side elongated element 8 and the wheel side elongated element 9. According to one embodiment, said at least one circumferential bridge 54 connects a central caliper bridge 51 with an adjacent side caliper bridge 10. According to one embodiment, said caliper body 7 comprises at least two central caliper bridges 51, at least four side caliper bridges 10 and at least two circumferential bridges 54.

Said hub bracket 13 of said assembly 1 comprises a hub bracket body 14 connected to at least one portion of the caliper body 7.

Preferably, said hub bracket body 14 is connected to at least one portion of said vehicle side elongated element 8 of the caliper body 7.

According to one embodiment, said hub bracket body 14 comprises a hub bracket inner side 55 suitable for facing the first braking surface 5 of the brake disc 4, and a hub bracket outer side 56 opposite to said hub bracket inner side. Preferably, said hub bracket inner side 55 forms a structural continuity with said inner caliper side of vehicle side elongated element 28.

According to a preferred embodiment, said hub bracket body 14 comprises at least one coupling surface 15 suitable for coupling to at least one bearing for supporting a wheel hub 18 connectable to the brake disc 4 and to a wheel of the vehicle. According to one embodiment, said coupling surface 15 of the hub bracket body 14 is suitable for facing a wheel hub 18 of the vehicle indirectly by means of at least one bearing.

According to a preferred embodiment, said assembly 1 comprises at least three connecting elements 57, 58, 59 which connect the hub bracket body 14 to at least three separate portions of said vehicle side elongated element 8 of the caliper body 7.

Preferably, said at least three connecting elements 57, 58, 59 comprise at least two side connecting elements 57 which connect said hub bracket body 14 to said two side portions of vehicle side elongated element 53 of the caliper body 7. Thereby, said hub bracket 13 may firmly be restrained to portions of the brake caliper 3 which being circumferentially opposed, allow a balanced connection. Preferably, said at least two side connecting elements 57 are made in single piece with said hub bracket body 14.

According to one embodiment, said at least three connecting elements 57, 58, 59 of said assembly 1 further comprise at least one central connecting element 58 which connects said hub bracket body 14 to said central portion of vehicle side elongated element 52. Thereby, said hub bracket 13 may firmly be restrained to said central portion of vehicle side elongated element 52. Preferably, said central connecting element 58 is made in single piece with said hub bracket body 14.

According to one embodiment, said at least three connecting elements 57, 58, 59 of said assembly 1 comprise at least one adjustable connecting element 59 which extends along a longitudinal path, said adjustable connecting device (59) comprising at least one adjustment device 60 suitable for adjusting the extension of the longitudinal path of said adjustable connecting device 59. Said adjustable connecting element 59 is suitable for serving as tie rod between said hub bracket 13 and said brake caliper 3. Thereby, said adjustment device 60 allows the path of said connecting device of said assembly 1 to be lengthened or shortened.

According to one embodiment, said adjustment device 60 comprises at least one screw-nut screw assembly. According to one embodiment, said adjustable connecting element 59 extends in a telescopic manner. According to one embodiment, said adjustment device 60 comprises an internally threaded sleeve which acts in conjunction with at least one threaded element, and preferably with two opposite threaded elements arranged at opposite longitudinal end portions of said internally threaded sleeve so as to form a telescopically extensible device.

Due to the provision of said adjustment device 60 of said adjustable connecting elements 59, the tensional status of the brake caliper 3 and also of the hub bracket 13 may also be adjusted several times during the operating life of said assembly 1. The provision of said adjustment device 60 of said adjustable connecting elements 59 also allows compensating for any misalignments between components due to manufacturing tolerances which are not high enough.

Preferably, said at least three connecting elements 57, 58, 59 comprise at least two adjustable connecting elements 59 which connect said hub bracket body 14 to said two side portions of vehicle side elongated element 53 of the caliper body 7.

According to one embodiment, said assembly 1 comprises at least two circumferentially opposite side connecting elements 57 and at least two circumferentially opposite adjustable connecting elements 59 which connect said hub bracket body 14 to said two side portions of vehicle side elongated element 53 of the caliper body 7, in which said at least two adjustable connecting elements 59 are circumferentially opposite to said two side connecting elements 57.

According to one embodiment, said assembly 1 comprises at least two circumferentially opposite side connecting elements 57 and at least one central connecting device 58.

According to a preferred embodiment, said vehicle side elongated element 8, said wheel side elongated element 9, said at least one caliper bridge 10, 51 and said hub bracket body 14 are made in single piece. In other words, said caliper body 7 and said hub bracket body 14 are made in single piece.

According to a preferred embodiment, said vehicle side elongated element 8, said wheel side elongated element 9, said at least two side caliper bridges 10 and said hub bracket body 14 are made in single piece.

Due to the provision of said vehicle side elongated element 8, said wheel side elongated element 9, said side caliper bridge 10 and said hub bracket body 14 made in single piece, said assembly 1 may be manufactured by melting in a single casting. At the same time, said assembly 1 may be manufactured with the use of one mold alone.

Due to the provision of such a brake caliper and hub bracket assembly 1, the number of elements to be assembled may be minimized. At the same time, the risk of making elements to be assembled that are morphologically incompatible with one another, is minimized. Moreover, the number of fastening seats, e.g. blind or through holes, to be made in said caliper body 7 and in said hub bracket body 14 for housing fastening elements, e.g. threaded fastening elements, such as for example, screws, stud bolts or fastening grub-screws, may be minimized, thus also reducing the processing time.

Due to the provision of a brake caliper and hub bracket assembly 1 comprising said vehicle side elongated element 8, said wheel side elongated element 9, said side caliper bridge 10 and said hub bracket body 14 made in single piece, a brake caliper and hub bracket assembly may be made with improved structural rigidity, weight being equal, or weighing less, structural rigidity being equal. Thereby, a caliper body 7 may be obtained which has less deformations, e.g. torsion deformations, during the braking action, weight being equal. Thereby, the contribution of material to make the caliper body 7 may be reduced, performance being equal in terms of structural rigidity and resistance to deformations, e.g. torsional deformations.

According to a preferred embodiment, said caliper body 7 exclusively comprises at least two side caliper bridges 10, thus avoiding to comprise said at least one central caliper bridge 51.

According to one embodiment, said at least two side caliper bridges 10, said vehicle side elongated element 8 and said wheel side elongated element 9 delimit a caliper opening 35. In other words, said caliper body 7 comprises a caliper opening edge which at least partly, and preferably completely, delimits said caliper opening 35. Said caliper opening 35 is radially outward with respect to said first thrust means seats 16 and said second thrust means seats 17. Said caliper opening 35 is suitable for making said at least one brake pad 11, 12 radially accessible. Said caliper opening 35 is of such a size that said at least one brake pad 11, 12 can cross it. In other words, said caliper opening 35 has circumferential extension greater than the circumferential extension of said at least one brake pad 11, 12, and axial extension greater than the axial extension of said at least one brake pad 11, 12 when it is assembled to the body of the brake caliper. Thereby, said at least one brake pad 11, 12 may be mounted to the body of the brake caliper 3 by inserting it in radially inner direction RI from said caliper opening 35, also when the brake caliper 3 as well as said assembly 1 is arranged straddling the brake disc 4. At the same time, the at least one brake pad 11, 12 may be radially outwardly extracted through the caliper opening 35. Preferably, said caliper opening 35 is of such a size that both said at least a first brake pad 11 and said at least a second brake pad 12 can cross it at the same time.

The provision of said side caliper bridges 10 and also of said caliper opening 35 allows the assembly of the brake pads 11, 12 to the body of the brake caliper to be simplified, and also the disassembly of the brake pads 11, 12 from the body of the brake caliper 3 to be simplified. Indeed, the at least one brake pad 11, 12 may be made radially accessible also when the brake caliper 3 is arranged straddling the brake disc 4 or when the brake caliper and hub bracket assembly 1 is assembled to the brake disc 4, thus avoiding to separate the brake disc 4 from assembly 1.

Due to the provision of such a caliper opening 35 of said caliper body 7, the brake pads 11, 12 may be radially outwardly extracted also when the brake disc 4 is assembled to assembly 1. At the same time, extracting the brake pads 11, 12 from the brake caliper 3 by moving them radially outwardly through said caliper opening 35 allows a predetermined volume to be freed between the inner caliper side of vehicle side elongated element 28 and the inner caliper side of wheel side elongated element 29, thereby allowing the brake disc 4 to be inclined to separate it from the vehicle, for example from the wheel hub 18 of the vehicle, also when said assembly 1 is mounted on the vehicle, for example mounted on said wheel hub 18. Said predetermined volume freed due to the extraction of the brake pads 11, 12 allows a peripheral portion of the braking band 39 of the brake disc 4 to be received when said brake disc is inclined in order to assemble it or disassemble it to/from the wheel hub 18.

According to one embodiment, said disc of disc brake 4 is made with straight bell of brake disc, therefore with an offset equal to zero and bearing suitable for the disassembly of the disc by removing it beforehand from the hub bracket for a short stretch first only in axial direction and then also only in radial direction to extract it from the caliper.

The provision of such a caliper opening 35 allows the heat accumulated by the brake disc 4 and also by the brake pads 11, 12, and accordingly by the caliper body 7, to be evacuated during the braking action. Due to the provision of such a caliper opening 35, the ventilation of the brake disc 4 and also of the brake pads 11, 12, is promoted. Due to the provision of a brake caliper and hub bracket assembly 1 comprising said vehicle side elongated element 8, said wheel side elongated element 9, said side caliper bridge 10 and said hub bracket body 14 made in single piece, such a caliper opening 35 may be made by circumferentially spacing said at least two side caliper bridges 10 apart from each other.

According to a preferred embodiment, said brake caliper 3 comprises at least a first brake pad 11 suitable for pressing against said first braking surface 5 of the brake disc 4, and at least a second brake pad 12 suitable for pressing against said second braking surface 6 of the brake disc 4. In other words, said brake caliper 4 comprises opposed brake pads 11, 12. The radial R-R and circumferential C-C directions are considered defined also on one brake pad 11, 12 considered alone. Each of said at least a first brake pad 11 and said at least a second brake pad 12 comprises a friction material 20 suitable for pressing against the facing braking surface 5 or 6 of the brake disc 4, and a support plate 19 of the friction material 20 having opposite sides 24, 25 in circumferential direction.

According to one embodiment, said brake caliper 3 comprises at least a first pad support pin 21 suitable for receiving a pad in abutment, which protrudes cantilevered from the inner caliper side of vehicle side elongated element 28, which is suitable for forming at least a circumferential abutment for said at least a first brake pad 11 so as to transfer the braking action from said at least a first brake pad 11 to the caliper body 7, and at least a second pad support pin 22 suitable for receiving a pad in abutment, which protrudes cantilevered from the inner caliper side of wheel side elongated element 29 suitable for forming a least a circumferential abutment for said at least a second brake pad 12 so as to transfer the braking action from said at least a second brake pad 21 to the caliper body 7. According to one embodiment, said at least a first pad support pin 21 is suitable for guiding the axial sliding of the at least a first brake pad 11, and said at least a second pad support pin 22 is suitable for guiding the axial sliding of the at least a second brake pad 12.

According to one embodiment, said caliper body 7 comprises pin seats 30 suitable for receiving said pad support pins 21, 22. In other words, said brake caliper 3 comprises pin seats 30 which accommodate said pad support pins 21, 22. Preferably, said pin seats 30 are through holes suitable for putting the inner caliper side of said vehicle side elongated element 28 into communication with the outer caliper side of said vehicle side elongated element 26, or the inner caliper side of said wheel side elongated element 29 with the outer caliper side of said wheel side elongated element 27. Thereby, each pin seat 30 comprises an outer caliper side mouth 31 which leads to said outer caliper side of vehicle side elongated element 26 or to said caliper outer side of wheel side elongated element 27. Preferably, the pad support pins 21, 22 are inserted in said pin seat 30 and are extracted from the pin seat 30 from the outer caliper side mouth 31 of the pin seat 30.

Preferably, said brake caliper 3 comprises at least one pair of said first pad support pins 21 arranged circumferentially separate to form a circumferential abutment for opposite sides of the support plate 19. Preferably, the support plate 19 at least partly delimits the at least one plate opening 23 having open or closed edge, in which said at least one plate opening 23 is suitable for receiving said at least a first pin 21 or said at least a second pad support pin 22.

Alternatively and according to a further embodiment again, said brake caliper 3 comprises pad support pins 61 suitable for hangingly supporting the pads 11, 12 close to the outer radial side of the brake caliper 3, so that the body of the pads is hanging inside the caliper body, thus avoiding resting pins 21, 22 like those described above (FIG. 23). Here, the caliper body preferably but not necessarily has flat abutment surfaces 62 directed radially, or parallel to a radial direction, and suitable for receiving the pads in abutment to discharge the braking action.

According to one embodiment, said brake caliper 3 comprises at least one elastic device 32 which affects said at least a first brake pad 11 and said at least a second brake pad 12 at least axially moving away from the brake disc 4, to avoid a residual braking torque from continuing at the end of the braking action. Preferably, said elastic device 32 affects said at least a first brake pad 11 and said at least a second brake pad 12 circumferentially, to avoid the knocking noise. According to one embodiment, said elastic device 32 affects said at least a first brake pad 11 and said at least a second brake pad 12 in said radially inner direction RI. According to one embodiment, said elastic device 32 is associated with the caliper body 7 by means of known fastening means of elastic device 33. Preferably, said caliper body 7 delimits fastening means seats of elastic device 34 suitable for receiving said fastening means of elastic device 33. Preferably, said means seats 34 are made in portions of the radially outward caliper body 7 with respect to the thrust means seats 16, 17.

Said fastening means of an elastic device 33 are for example, a tie rod screwed to the caliper body. In addition to fastening and charging the elastic device, said solution allows the axial deformations of the caliper body to be stiffened and contained.

According to one embodiment, said assembly 1 is associated with a protective plate of disc 38 suitable for protecting the disc from knocks against dust or debris raised by the vehicle when in operating conditions. According to one embodiment, said brake caliper and hub bracket assembly 1 is associated with brake fluid conducts 45 suitable for conveying the braking system operating fluid from and towards the caliper body 7. According to one embodiment, said brake caliper and hub bracket assembly 1 is associated with electric cables 46, for example connection cables for sensors of a wheel anti-blocking device (ABS), or according to a further embodiment, for feeding an electric motor for actuating the caliper in the case of an electro-mechanical caliper solution.

According to one embodiment, the hub bracket body 14 of said assembly 1 comprises connecting sites 41, 42 suitable for connecting said assembly 1 to the suspensions or to the steering of the vehicle. Preferably, said connecting sites 41, 42 are made in single piece with said hub bracket body 14. According to one embodiment, said connecting sites 41, 42 comprise at least one connecting site to the suspensions of vehicle 41 suitable for forming a connection with the vehicle suspension unit, for example a shock absorber of the vehicle, and at least one connecting site to the steering of vehicle 42 suitable for forming a connection with the vehicle steering device.

According to one embodiment, said hub bracket body 14 delimits a plurality of openings of hub bracket 43 or hub bracket windows 43. Thereby, the hub bracket body 14 may be lightened and at the same time, the evacuation of the heat accumulated by the brake disc 4 and the ventilation of the brake disc 4 may be promoted. According to one embodiment, said hub bracket body 14 comprises material arranged along the force distribution lines, thus avoiding to structurally weaken the hub bracket body 14. According to one embodiment, said hub bracket windows 43 extend for at least one fourth, and preferably at least one third, of the volume of the hub bracket body 14 in the plane defined by the circumferential C-C and radial R-R directions. Thereby, a resistant and lightweight hub bracket body 14 is obtained.

According to one embodiment, said hub bracket body 14 comprises a first portion of hub bracket body 46, which comprises said coupling surface 15, and a second portion of hub bracket body 47, which extends in outer radial direction RE from said first portion of hub bracket body 46. Preferably, said second portion of hub bracket body 46 at least partly delimits said hub bracket windows 43. Preferably, said second portion of hub bracket body 47 comprises connecting spokes 48 which at least partly delimit said hub bracket windows 43. According to one embodiment, said connecting spokes 48 have a non-rectilinear or winding extension. According to one embodiment, said connecting spokes 48 have a path which mainly extends in substantially radial direction R-R.

According to one embodiment, said coupling surface 15 delimits a cavity 49 suitable for receiving at least one portion of wheel hub 18. Preferably, said coupling surface 15 is a substantially cylindrical surface.

According to one general embodiment, a disc brake 2 comprises at least one brake caliper and hub bracket assembly 1, according to any one of the embodiments described above, and at least one brake disc 4 having a first braking surface 5 and a second braking surface 6, opposite to said first braking surface 5. Said brake caliper (3) of the assembly (1) is arranged straddling the brake disc (4).

According to one embodiment, said brake disc 4 is suitable for being connected to a wheel hub 18 supported by at least one bearing coupled to said at least one coupling surface 15 of the hub bracket body 14.

Preferably, said brake disc 4 comprises a braking band 39 comprising said first braking surface 5 and said second braking surface 6, and a disc bell 40. According to one embodiment, the disc bell 40 of said brake disc 4 is suitable for being firmly connected by known means 37 for connecting the disc to a fastening flange 36 of the wheel hub 18.

According to one embodiment, said brake disc 4 is a fixed disc. According to one embodiment, said brake disc 4 is a floating or sliding disc.

According to one embodiment, at least the braking band 39 of the brake disc 4 is at least partly made of ceramic material, e.g. carbon-ceramic. According to one embodiment, the braking band 39 of the brake disc 4 comprises at least two plates which define a ventilation gap between them.

A method for disassembling a disc brake 2 comprising a brake caliper and hub bracket assembly 1 is described below.

A method for disassembling a disc brake comprises the following steps:

-A- providing a disc brake 2 comprising a brake disc 4 having a first braking surface 5 and a second braking surface 6, opposite to said first braking surface 5, and a brake caliper and hub bracket assembly; said disc brake 2 defining an axial direction X-X coinciding with or parallel to the rotation axis of the brake disc 4, a radial direction R-R orthogonal to the axial direction X-X and defining an outer radial direction RE, when facing away from the rotation axis of the brake disc 4, and an opposite inner radial direction RI, and a circumferential C-C or tangential direction C-C, both orthogonal to the axial direction X-X and to the radial direction R-R; said assembly 1 comprising at least one brake caliper 3 arranged straddling the brake disc 4, said brake caliper 3 comprising a caliper body 7 comprising an elongated element 8 facing said first braking surface 5 of the brake disc 4 indirectly by means of at least a first brake pad 11, and a wheel side elongated element 9 opposed to said vehicle side elongated element 8 and facing said second braking surface 6 of the brake disc 4 indirectly by means of at least a second brake pad 12; said caliper body 7 comprising at least two side caliper bridges 10 arranged straddling the brake disc 4, which connect said vehicle side elongated element 8 and said wheel side elongated element 9; said at least two side caliper bridges 10, said vehicle side elongated element 8 and said wheel side elongated element 9 being made in single piece and delimiting a caliper opening 35; said assembly 1 also comprising a hub bracket 13 suitable for creating a support for said brake caliper 3, and comprising a hub bracket body 14 connected to at least one portion of the caliper body 7 and at least one coupling surface 15 suitable for coupling to at least one bearing for supporting a wheel hub 18 connectable to the brake disc 4 and to a wheel of the vehicle;

-B- extracting said at least one brake pad 11, 12 from the brake caliper 3 through said caliper opening 35 by moving the brake pad in radially outward direction RE so as to free an inner caliper volume 44 between said vehicle side elongated element 8 and said wheel side elongated element 9;

-C- disassociating said brake disc 4 from the vehicle;

-D- tilting the brake disc 4 with respect to the brake caliper and hub bracket assembly 1 by bringing a portion of braking band 39 of the brake disc 4 to occupy a portion of the inner caliper volume 44 which was occupied by the at least one brake pad 11, 12;

-E- extracting the at least one portion of the braking band 39 of the brake disc 4, which is between said vehicle side elongated element 8 and said wheel side elongated element 9, by substantially moving in radially inward direction RI.

Alternatively to step D, if the disc for disc brake 4 is made with a straight bell with offset equal to zero, the disc may be removed from the hub bracket beforehand for a short stretch first only in axial direction and then also only in radial direction to extract it from the caliper.

Due to the provision of such a method, the brake disc 4 and the brake pads 11, 12 may be separated from a disc brake 2, thus preventing said brake caliper and hub bracket assembly from being disassociated from the vehicle on which it is mounted.

According to one possible operating method, instead of said step -A-, said method comprises the step of providing a disc brake 2 comprising a brake caliper and hub bracket assembly 1 according to any one of the embodiments described above.

According to one possible operating method, said method comprises, before step -B-, the step of disassembling said elastic device 32 from the caliper body 7, thus preventing said caliper opening 35 from being occluded.

According to one possible operating method, said method comprises, before step -B-, the step of removing said pad support pins 21, 22 from the outer caliper side mouth 31 of the respective pin seats 30 in which they are inserted.

According to one possible operating method, the steps are executed in the order indicated.

Due to the provision of such a method, a simplified disassembly of the disc brake 2 comprising such a brake caliper and hub bracket assembly 1 may be allowed.

A method for calibrating the desired tension of a brake caliper 3 in a brake caliper and hub bracket assembly is described below.

A method for calibrating the desired tension of a brake caliper 3 comprises the following steps:

providing a brake caliper and hub bracket assembly according to any one of the embodiments described above, in which said at least three connecting elements 57, 58, 59 of said assembly 1 comprise at least one adjustable connecting element 59 which extends along a longitudinal path;

adjusting the longitudinal extension of said at least one adjustable connecting element 59;

assessing the state of tension of the brake caliper 3.

According to one possible operating method, the step of assessing the state of tension of the brake caliper 3 is performed by means of at least one extensometer, which is not necessarily piezoelectric.

According to one possible operating method, the step of adjusting the longitudinal extension of said at least one adjustable connecting element 59 is performed by activating said adjustment device 60.

According to one possible operating method, a method for calibrating the desired tension of a brake caliper 3 comprises the step of providing a brake caliper and hub bracket assembly in which said at least three connecting elements 57, 58, 59 of said assembly 1 comprise at least two circumferentially opposite adjustable connecting elements 59. Thereby, the tension status of the brake caliper 3 may be adjusted in circumferentially opposite portions of the caliper body 7.

Due to the above-described features provided separately from or together with one another, where applicable, in particular embodiments, a solution is provided to the needs listed above, thus obtaining the aforesaid advantages, and in particular:

the weight of a brake caliper and hub bracket assembly may be reduced, structural rigidity of the assembly being equal;

the deformability of the brake caliper and hub bracket assembly 1 may be reduced, structural rigidity of the assembly being equal;

a caliper body 7 may be obtained which has less torsion deformations, during the braking action, weight of the assembly or of the caliper body being equal;

due to the reduced deformability particularly of the caliper body 7 of the brake caliper and hub bracket assembly 1, a homogeneous wear of the brake pads 11, 12 of the brake caliper 3 may be obtained, weight being equal;

the tensional state of the brake caliper 3 may be adjusted thus providing a structural preload which reduces the deformation of the brake caliper and hub bracket assembly during the operation conditions;

a caliper opening may be obtained having such an extension as to allow the brake pads 11, 12 to be accessed and to be inserted or extracted through said caliper opening, also when the brake disc 4 is assembled on the brake caliper and hub bracket assembly;

at the same time, satisfactory performance may be obtained in terms of cooling the disc brake, and also ventilating the disc;

a simplified disassembly method of the disc brake comprising a brake caliper and hub bracket assembly, is provided.

Those skilled in the art may make many changes and adaptations to the embodiments described above or can replace elements with others which are functionally equivalent in order to meet contingent needs without however departing from the scope of the appended claims.

LIST OF REFERENCES

1. Brake caliper and hub bracket assembly, or assembly
2. Disc brake
3. Brake caliper
4. Brake disc
5. First braking surface of the brake disc
6. Second braking surface of the brake disc
7. Caliper body 8. First elongated element of the caliper body, or vehicle side elongated element
9. Second elongated element of the caliper body, or wheel side elongated element
10. Side caliper bridge
11. First brake pad
12. Second brake pad
13. Hub bracket
14. Hub bracket body
15. Coupling surface of the hub bracket body
16. First thrust means seat
17. Second thrust means seat
18. Wheel hub
19. Brake pad support plate
20. Friction material of the brake pad
21. First pad support pin
22. Second pad support pin
23. Plate opening
24. First side of the brake pad
25. Second side of the brake pad
26. Outer caliper side of vehicle side elongated element
27. Outer caliper side of wheel side elongated element
28. Inner caliper side of vehicle side elongated element
29. Inner caliper side of wheel side elongated element
30. Pin seat
31. Outer caliper side mouth
32. Elastic device
33. Fastening means of the elastic device
34. Fastening means seat of the elastic device
35. Caliper opening
36. Fastening flange
37. Fastening means of the disc
38. Protective plate of the disc
39. Braking band
40. Disc bell
41. Connecting site to the vehicle suspensions
42. Connecting site to the vehicle steering
43. Hub bracket window or hub bracket opening
44. Inner caliper volume
45. Brake fluid conduits
46. First portion of hub bracket
47. Second portion of hub bracket
48. Connecting spokes
49. Hub bracket cavity
50. Electric cables
51. Central caliper bridge
52. Central portion of vehicle side elongated element
53. Side portion of vehicle side elongated element
54. Circumferential bridges
55. Hub bracket inner side
56. Hub bracket outer side
57. Side connecting device of the assembly
58. Central connecting device of the assembly
59. Adjustable connecting device of the assembly
60. Adjustment device
61. Pad support pins
62. Pad support surfaces provided in the caliper body
X-X. Axial direction
R-R. Radial direction
C-C. Circumferential or tangential direction
RI. Radially inner direction
RE. Radially outer direction

The invention claimed is:

1. A disc brake caliper and hub bracket assembly for a disc brake of a vehicle, comprising:
at least one brake caliper, suitable for straddling a brake disc of a disc brake, said brake disc having a first braking surface and a second braking surface, opposite to said first braking surface, said disc brake defining an axial direction coinciding with or parallel to the rotation axis of the brake disc, a radial direction orthogonal to the axial direction and a circumferential or tangential direction orthogonal both to the axial direction and to the radial direction;
said brake caliper comprising a caliper body comprising a first elongated element, or vehicle side elongated element, suitable for facing said first braking surface of the brake disc directly or indirectly by at least a first brake pad, and a second elongated element, or wheel side elongated element, opposed to said vehicle side elongated element and suitable for facing said second braking surface of the brake disc directly or indirectly by at least a second brake pad;
wherein said vehicle side elongated element of the caliper body comprises at least a first thrust means seat suitable for receiving a piston for exerting a thrust action on said at least first brake pad;
and wherein said wheel side elongated element of the caliper body comprises at least a second thrust means seat suitable for receiving a piston for exerting a thrust action on said at least second brake pad;
said caliper body comprising at least one caliper bridge suitable for straddling the brake disc, said caliper bridge connecting said vehicle side elongated element and said wheel side elongated element;
said assembly further comprising a hub bracket suitable for providing a support for said brake caliper; said hub bracket comprising a hub bracket body connected to at least one portion of the vehicle side elongated element of the caliper body;
said hub bracket body comprising at least one coupling surface suitable for coupling to at least one bearing for supporting a wheel hub connectable to the brake disc and to a wheel of the vehicle;
wherein said assembly further comprises at least three connecting elements which connect the hub bracket body to at least three separate portions of said vehicle side elongated element of the caliper body.

2. The assembly of claim 1, wherein said vehicle side elongated element of the caliper body comprises a central portion of vehicle side elongated element and two side portions of vehicle side elongated element, which are circumferentially opposed to said central portion of vehicle side elongated element;
and wherein said at least three connecting elements comprise at least two side connecting elements which connect said hub bracket body to said two side portions of vehicle side elongated element of the caliper body; and/or wherein
said at least two side connecting elements are made in single piece with said hub bracket body.

3. The assembly of claim 1, wherein said at least three connecting elements of said assembly comprise at least one adjustable connecting element which extends along a longitudinal path, said adjustable connecting element comprising at least one adjustment device suitable for adjusting the extension of the longitudinal path of said adjustable connecting element.

4. The assembly of claim 1, wherein said vehicle side elongated element, said wheel side elongated element, said at least one caliper bridge and said hub bracket body are made in single piece.

5. The assembly of claim 1, wherein said caliper body comprises at least two side caliper bridges spaced apart from one another in circumferential direction by a predetermined circumferential distance greater than or equal to the extension in circumferential direction of the at least one brake pad of the brake caliper; and wherein said at least two side caliper bridges, said vehicle side elongated element and said wheel side elongated element delimit a caliper opening suitable for making said at least one brake pad radially accessible; and wherein said caliper opening is of such a size that said at least one brake pad can cross said caliper opening; or wherein said caliper opening is of such a size that both said at least first brake pad and said at least second brake pad can cross said caliper opening at the same time.

6. The assembly of claim 1, wherein said hub bracket body delimits a plurality of hub bracket windows.

7. The assembly of claim 1, wherein said brake caliper is a fixed caliper; and wherein said brake caliper comprises at least a first brake pad suitable for pressing against said first braking surface of the brake disc, and at least a second brake pad suitable for pressing against said second braking surface of the brake disc, so that said brake caliper comprises opposed brake pads.

8. The assembly of claim 1, wherein said at least three connecting elements comprise at least two adjustable connecting elements which connect said hub bracket body to said two side portions of vehicle side elongated element of the caliper body.

9. The assembly of claim 1, wherein said assembly comprises at least two circumferentially opposite side connecting elements and at least two circumferentially opposite adjustable connecting elements which connect said hub bracket body to said two side portions of vehicle side elongated element of the caliper body, wherein said at least two adjustable connecting elements are circumferentially opposite to said two side connecting elements; or wherein said at least three connecting elements of said assembly further comprise at least one central connecting element which connects said hub bracket body to said central portion of vehicle side elongated element.

10. The assembly of claim 1, wherein the hub bracket body of said assembly comprises connecting sites suitable for connecting said assembly to the suspensions or to the steering of the vehicle.

11. A disc brake comprising:
at least one brake caliper and hub bracket assembly comprising:
at least one brake caliper, suitable for straddling a brake disc of a disc brake, said brake disc having a first braking surface and a second braking surface, opposite to said first braking surface, said disc brake defining an axial direction coinciding with or parallel to the rotation axis of the brake disc, a radial direction orthogonal to the axial direction and a circumferential or tangential direction orthogonal both to the axial direction and to the radial direction;
said brake caliper comprising a caliper body comprising a first elongated element, or vehicle side elongated element, suitable for facing said first braking surface of the brake disc directly or indirectly by at least a first brake pad, and a second elongated element, or wheel side elongated element, opposed to said vehicle side elongated element and suitable for facing said second braking surface of the brake disc directly or indirectly by at least a second brake pad;
wherein said vehicle side elongated element of the caliper body comprises at least a first thrust means seat suitable for receiving a piston for exerting a thrust action on said at least first brake pad;
and wherein said wheel side elongated element of the caliper body comprises at least a second thrust means seat suitable for receiving a piston for exerting a thrust action on said at least second brake pad;
said caliper body comprising at least one caliper bridge suitable for straddling the brake disc, said caliper bridge connecting said vehicle side elongated element and said wheel side elongated element;
said assembly further comprising a hub bracket suitable for providing a support for said brake caliper; said hub bracket comprising a hub bracket body connected to at least one portion of the vehicle side elongated element of the caliper body;
said hub bracket body comprising at least one coupling surface suitable for coupling to at least one bearing for supporting a wheel hub connectable to the brake disc and to a wheel of the vehicle;
wherein said assembly further comprises at least three connecting elements which connect the hub bracket body to at least three separate portions of said vehicle side elongated element of the caliper body;
at least one brake disc having a first braking surface and a second braking surface, opposite to said first braking surface;
wherein the brake caliper of the assembly is arranged straddling the brake disc.

12. A method for calibrating a desired tension of a brake caliper, comprising the following steps:
providing a brake caliper and hub bracket assembly comprising:
at least one brake caliper, suitable for straddling a brake disc of a disc brake, said brake disc having a first braking surface and a second braking surface, opposite to said first braking surface, said disc brake defining an axial direction coinciding with or parallel to the rotation axis of the brake disc, a radial direction orthogonal to the axial direction and a circumferential or tangential direction orthogonal both to the axial direction and to the radial direction;
said brake caliper comprising a caliper body comprising a first elongated element, or vehicle side elongated element, suitable for facing said first braking surface of the brake disc directly or indirectly by at least a first brake pad, and a second elongated element, or wheel side elongated element, opposed to said vehicle side elongated element and suitable for facing said second braking surface of the brake disc directly or indirectly by at least a second brake pad;
wherein said vehicle side elongated element of the caliper body comprises at least a first thrust means seat suitable for receiving a piston for exerting a thrust action on said at least first brake pad;
and wherein said wheel side elongated element of the caliper body comprises at least a second thrust means seat suitable for receiving a piston for exerting a thrust action on said at least second brake pad;
said caliper body comprising at least one caliper bridge suitable for straddling the brake disc, said caliper bridge connecting said vehicle side elongated element and said wheel side elongated element;
said assembly further comprising a hub bracket suitable for providing a support for said brake caliper; said hub bracket comprising a hub bracket body connected to at least one portion of the vehicle side elongated element of the caliper body;

said hub bracket body comprising at least one coupling surface suitable for coupling to at least one bearing for supporting a wheel hub connectable to the brake disc and to a wheel of the vehicle;

wherein said assembly further comprises at least three connecting elements which connect the hub bracket body to at least three separate portions of said vehicle side elongated element of the caliper body, wherein said at least three connecting elements comprise at least one adjustable connecting element which extends along a longitudinal path;

adjusting a longitudinal extension of said at least one adjustable connecting element;

assessing a state of tension of the brake caliper.

13. The method of claim 12, wherein said at least three connecting elements of said assembly comprise at least two circumferentially opposite adjustable connecting elements; further comprising the steps of:

assessing the state of tension of the brake caliper by at least one extensometer, adjusting the longitudinal extension of said at least one adjustable connecting element by activating an adjustment device.

* * * * *